(12) United States Patent
Ryu et al.

(10) Patent No.: US 12,408,197 B2
(45) Date of Patent: Sep. 2, 2025

(54) TRANSMITTING INTER-USER-EQUIPMENT COORDINATION INFORMATION BASED AT LEAST IN PART ON BEAMFORMING

(71) Applicant: QUALCOMM Incorporated, San Diego, CA (US)

(72) Inventors: Jung Ho Ryu, Fort Lee, NJ (US); Sony Akkarakaran, Poway, CA (US); Sourjya Dutta, San Diego, CA (US); Gabi Sarkis, San Diego, CA (US); Hua Wang, Basking Ridge, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 17/815,874

(22) Filed: Jul. 28, 2022

(65) Prior Publication Data
US 2024/0040614 A1    Feb. 1, 2024

(51) Int. Cl.
*H04W 74/08* (2024.01)
*H04L 5/00* (2006.01)
*H04W 16/28* (2009.01)
*H04W 74/0808* (2024.01)

(52) U.S. Cl.
CPC ....... *H04W 74/0808* (2013.01); *H04L 5/0051* (2013.01); *H04W 16/28* (2013.01)

(58) Field of Classification Search
CPC ............ H04W 74/0808; H04W 16/28; H04W 74/0816; H04W 92/18; H04W 76/14; H04W 72/02; H04L 5/0051; H04B 7/0695
See application file for complete search history.

(56) References Cited

U.S. PATENT DOCUMENTS

| | | | | |
|---|---|---|---|---|
| 2018/0288755 A1* | 10/2018 | Liu | ............... | H04W 56/0015 |
| 2022/0167345 A1* | 5/2022 | Jeong | ............... | H04W 72/02 |
| 2023/0403728 A1* | 12/2023 | Hwang | ............... | H04W 72/02 |
| 2024/0114502 A1* | 4/2024 | Liu | ............... | H04W 76/14 |
| 2024/0121819 A1* | 4/2024 | Hui | ............... | H04W 72/40 |
| 2024/0155574 A1* | 5/2024 | Hui | ............... | H04W 72/0446 |
| 2024/0340654 A1* | 10/2024 | Niu | ............... | H04W 16/28 |
| 2024/0349338 A1* | 10/2024 | Zhou | ............... | H04W 72/54 |
| 2024/0397535 A1* | 11/2024 | Yoshioka | ............... | H04W 72/04 |

* cited by examiner

*Primary Examiner* — Mewale A Ambaye
(74) *Attorney, Agent, or Firm* — Harrity & Harrity LLP/Qualcomm Incorporated

(57) ABSTRACT

Various aspects of the present disclosure generally relate to wireless communication. In some aspects, a first user equipment (UE) may determine, based at least in part on a channel sensing using a receive beam of the first UE, preferred resources or non-preferred resources of the first UE for a sidelink transmission by a second UE. The UE may transmit, to the second UE, inter-UE coordination (IUC) information that indicates: a transmit beam of the second UE, and the preferred resources or the non-preferred resources of the first UE, wherein the preferred resources or the non-preferred resources of the first UE are to be applied to the transmit beam of the second UE indicated in the IUC information. Numerous other aspects are described.

32 Claims, 22 Drawing Sheets

TRANSMITTING INTER-USER-EQUIPMENT COORDINATION INFORMATION BASED AT LEAST IN PART ON BEAMFORMING

FIELD OF THE DISCLOSURE

Aspects of the present disclosure generally relate to wireless communication and to techniques and apparatuses for transmitting inter-user-equipment (UE) coordination (IUC) information based at least in part on beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, configured to: determine, based at least in part on a channel sensing using a receive (Rx) beam of the first UE, preferred resources or non-preferred resources of the first UE for a sidelink transmission by a second UE; transmit, to the second UE, inter-UE coordination (IUC) information that indicates: a transmit (Tx) beam of the second UE, and the preferred resources or the non-preferred resources of the first UE, wherein the preferred resources or the non-preferred resources of the first UE are to be applied to the Tx beam of the second UE indicated in the IUC information.

In some implementations, an apparatus for wireless communication at a second UE includes a memory and one or more processors, coupled to the memory, configured to: receive, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information; and transmit a sidelink transmission based at least in part on the IUC information.

In some implementations, an apparatus for wireless communication at a first UE includes a memory and one or more processors, coupled to the memory, configured to: determine, using an Rx beam of the first UE and based at least in part on a channel sensing, preferred resources or non-preferred resources of the first UE for a sidelink transmission by a second UE; and transmit, using a Tx beam of the first UE that is associated with the Rx beam of the first UE, IUC information that indicates the preferred resources or the non-preferred resources of the first UE.

In some implementations, an apparatus for wireless communication at a second UE includes a memory and one or more processors, coupled to the memory, configured to: receive, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE; and transmit, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information.

In some implementations, a method of wireless communication performed by a first UE includes determining, based at least in part on a channel sensing using an Rx beam of the first UE, preferred resources or non-preferred resources of the first UE for a sidelink transmission by a second UE; and transmitting, to the second UE, IUC information that indicates: a Tx beam of the second UE, and the preferred resources or the non-preferred resources of the first UE, wherein the preferred resources or the non-preferred resources of the first UE are to be applied to the Tx beam of the second UE indicated in the IUC information.

In some implementations, a method of wireless communication performed by a second UE includes receiving, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information; and transmitting a sidelink transmission based at least in part on the IUC information.

In some implementations, a method of wireless communication performed by a first UE includes determining, using an Rx beam of the first UE and based at least in part on a channel sensing, preferred resources or non-preferred resources of the first UE for a sidelink transmission by a second UE; and transmitting, using a Tx beam of the first UE that is associated with the Rx beam of the first UE, IUC information that indicates the preferred resources or the non-preferred resources of the first UE.

In some implementations, a method of wireless communication performed by a second UE includes receiving, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE; and transmitting, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information.

In some implementations, a non-transitory computer-readable medium storing a set of instructions for wireless communication includes one or more instructions that, when executed by one or more processors of a first UE, cause the first UE to: determine, based at least in part on a channel sensing using an Rx beam of the first UE, preferred resources or non-preferred resources of the first UE for a sidelink transmission by a second UE; and transmit, to the second UE, IUC information that indicates: a Tx beam of the second UE, and the preferred resources or the non-preferred resources of the first UE, wherein the preferred resources or the non-preferred resources of the first UE are to be applied to the Tx beam of the second UE indicated in the IUC information.

In some implementations, a non-transitory computer-readable medium storing a set of instructions for wireless communication includes one or more instructions that, when executed by one or more processors of a second UE, cause the second UE to: receive, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information; and transmit a sidelink transmission based at least in part on the IUC information.

In some implementations, a non-transitory computer-readable medium storing a set of instructions for wireless communication includes one or more instructions that, when executed by one or more processors of a first UE, cause the first UE to: determine, using an Rx beam of the first UE and based at least in part on a channel sensing, preferred resources or non-preferred resources of the first UE for a sidelink transmission by a second UE; and transmit, using a Tx beam of the first UE that is associated with the Rx beam of the first UE, IUC information that indicates the preferred resources or the non-preferred resources of the first UE.

In some implementations, a non-transitory computer-readable medium storing a set of instructions for wireless communication includes one or more instructions that, when executed by one or more processors of a second UE, cause the second UE to: receive, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE; and transmit, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information.

In some implementations, a first apparatus for wireless communication includes means for determining, based at least in part on a channel sensing using an Rx beam of the first apparatus, preferred resources or non-preferred resources of the first apparatus for a sidelink transmission by a second apparatus; and means for transmitting, to the second apparatus, IUC information that indicates: a Tx beam of the second apparatus, and the preferred resources or the non-preferred resources of the first apparatus, wherein the preferred resources or the non-preferred resources of the first apparatus are to be applied to the Tx beam of the second apparatus indicated in the IUC information.

In some implementations, a second apparatus for wireless communication includes means for receiving, from a first apparatus, IUC information that indicates: a Tx beam of the second apparatus, and preferred resources or non-preferred resources of the first apparatus, wherein the preferred resources or the non-preferred resources of the first apparatus are to be applied to the Tx beam of the second apparatus indicated in the IUC information; and means for transmitting a sidelink transmission based at least in part on the IUC information.

In some implementations, a first apparatus for wireless communication includes means for determining, using an Rx beam of the first apparatus and based at least in part on a channel sensing, preferred resources or non-preferred resources of the first apparatus for a sidelink transmission by a second apparatus; and means for transmitting, to the second apparatus and using a Tx beam of the first apparatus that is associated with the Rx beam of the first apparatus, IUC information that indicates the preferred resources or the non-preferred resources of the first apparatus, wherein the preferred resources or the non-preferred resources of the first apparatus are to be applied to a Tx beam of the second apparatus associated with an Rx beam of the second apparatus used to receive the IUC information.

In some implementations, a second apparatus for wireless communication includes means for receiving, from a first apparatus and via an Rx beam of the second apparatus, IUC information that indicates preferred resources or non-preferred resources of the first apparatus for a sidelink transmission by the second apparatus, wherein the IUC information is based at least in part on a channel sensing by the first apparatus using an Rx beam of the first apparatus; and means for transmitting, using a Tx beam of the second apparatus that is associated with the Rx beam of the second apparatus, the sidelink transmission based at least in part on the IUC information, wherein the preferred resources or the non-preferred resources of the first apparatus are to be applied to the Tx beam of the second apparatus associated with the Rx beam of the second apparatus used to receive the IUC information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
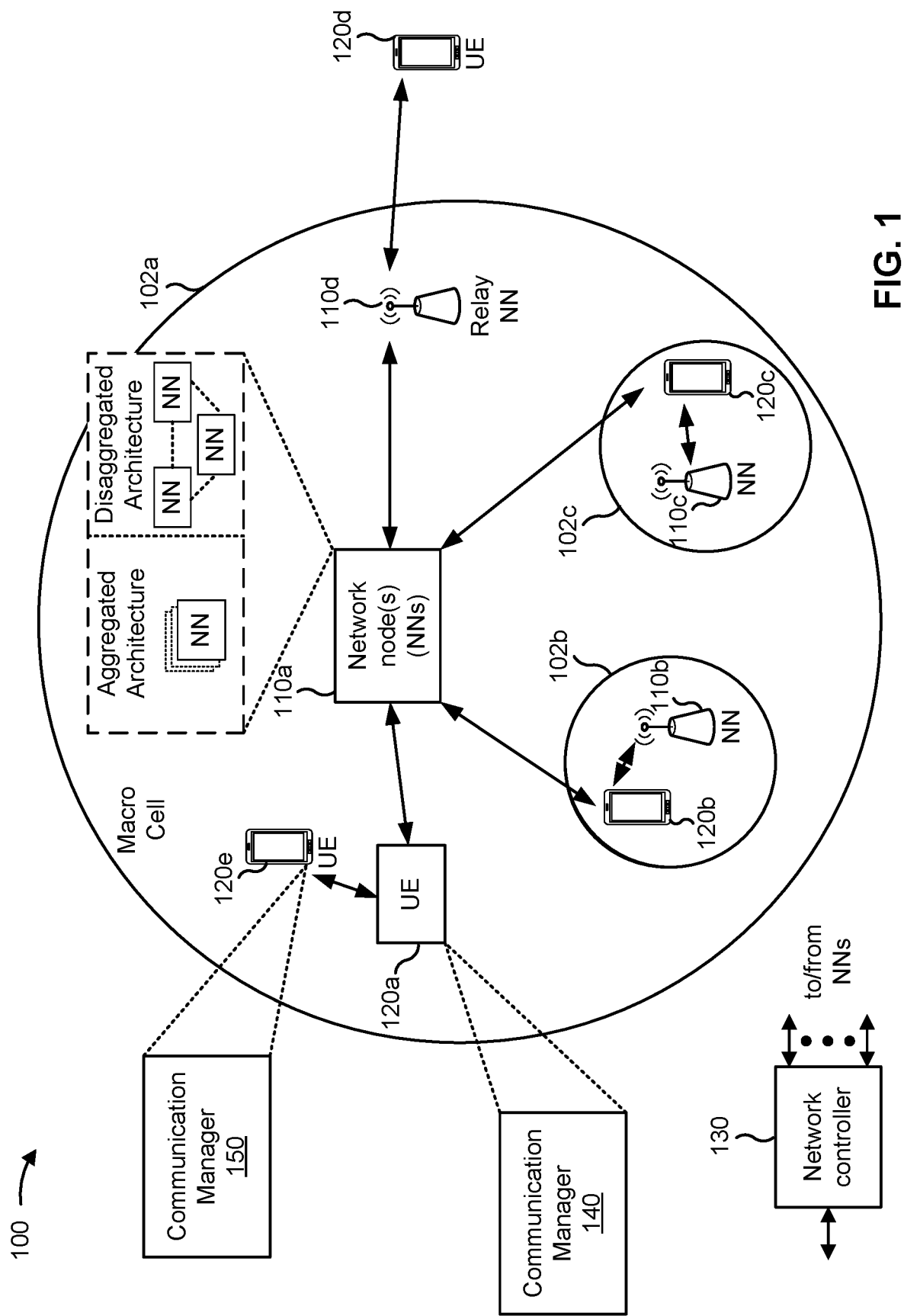
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LIE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100.

For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may determine, based at least in part on a channel sensing using a receive (Rx) beam of the first UE, preferred resources or non-preferred resources of the first UE for a sidelink transmission by a second UE; and transmit, to the second UE, inter-UE coordination (IUC) information that indicates: a transmit (Tx) beam of the second UE, and the preferred resources or the non-preferred resources of the first UE, wherein the preferred resources or the non-preferred resources of the first UE are to be applied to the Tx beam of the second UE indicated in the IUC information. Additionally, or alternatively, the communication manager 140 may perform one or more other operations described herein.

In some aspects, a second UE (e.g., 120e) may include a communication manager 150. As described in more detail elsewhere herein, the communication manager 150 may receive, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information; and transmit a sidelink transmission based at least in part on the IUC information. Additionally, or alternatively, the communication manager 150 may perform one or more other operations described herein.

In some aspects, a first UE (e.g., UE 120a) may include a communication manager 140. As described in more detail elsewhere herein, the communication manager 140 may determine, using a receive (Rx) beam of the first UE and based at least in part on a channel sensing, preferred resources or non-preferred resources of the first UE for a sidelink transmission by a second UE; and transmit, using a transmit (Tx) beam of the first UE that is associated with the Rx beam of the first UE, IUC information that indicates the preferred resources or the non-preferred resources of the first UE. Additionally, or alternatively, the communication manager 140 may perform one or more other operations described herein.

In some aspects, a second UE (e.g., UE 120e) may include a communication manager 150. As described in more detail elsewhere herein, the communication manager 150 may receive, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE; and transmit, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information. Additionally, or alternatively, the communication manager 150 may perform one or more other operations described herein.

As indicated above, FIG. 1 is provided as an example. Other examples may differ from what is described with regard to FIG. 1.

Figure 2:
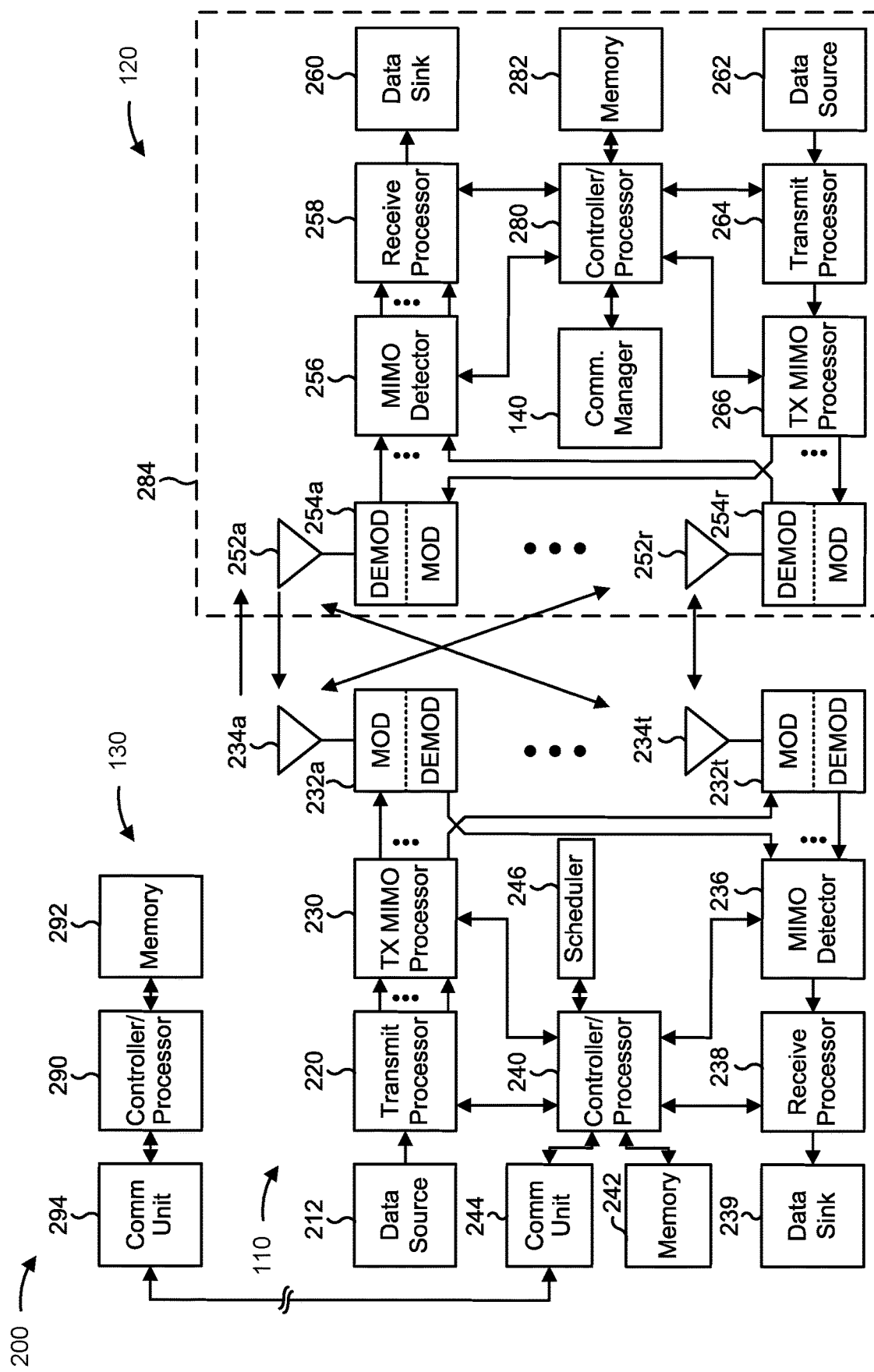
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 13-22).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 13-22).

The controller/processor 240 of the network node 110, the controller/processor 280 of the UE 120, and/or any other component(s) of FIG. 2 may perform one or more techniques associated with transmitting IUC information based at least in part on beamforming, as described in more detail elsewhere herein. For example, the controller/processor 240 of the network node 110, the controller/processor 280 of the UE 120, and/or any other component(s) of FIG. 2 may perform or direct operations of, for example, process 1700 of FIG. 17, process 1800 of FIG. 18, process 1900 of FIG. 19, process 2000 of FIG. 20, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1700 of FIG. 17, process 1800 of FIG. 18, process 1900 of FIG. 19, process 2000 of FIG. 20, and/or other processes as described herein. In some examples, executing instructions may include running the instructions, converting the instructions, compiling the instructions, and/or interpreting the instructions, among other examples.

In some aspects, a first UE (e.g., UE 120a) includes means for determining, based at least in part on a channel sensing using an Rx beam of the first UE, preferred resources or non-preferred resources of the first UE for a sidelink transmission by a second UE (e.g., using controller/processor 280, memory 282, or the like); and/or means for transmitting, to the second UE, IUC information that indicates: a Tx beam of the second UE, and the preferred resources or the non-preferred resources of the first UE, wherein the preferred resources or the non-preferred resources of the first UE are to be applied to the Tx beam of the second UE indicated in the IUC information (e.g., using controller/processor 280, transmit processor 264, TX MIMO processor 266, modem 254, antenna 252, memory 282, or the like). In some aspects, the first UE includes means for determining, using an Rx beam of the first UE and based at least in part on a channel sensing, preferred resources or non-preferred resources of the first UE for a sidelink transmission by a second UE (e.g., using controller/processor 280, memory 282, or the like); and/or means for transmitting, using a Tx beam of the first UE that is associated with the Rx beam of the first UE, IUC information that indicates the preferred resources or the non-preferred resources of the first UE (e.g., using controller/processor 280, transmit processor 264, TX MIMO processor 266, modem 254, antenna 252, memory 282, or the like). The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120e) includes means for receiving, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information (e.g., using antenna 252, modem 254, MIMO detector 256, receive processor 258, controller/processor 280, memory 282, or the like); and/or means for transmitting a sidelink transmission based at least in part on the IUC information (e.g., using controller/processor 280, transmit processor 264, TX MIMO processor 266, modem 254, antenna 252, memory 282, or the like). In some aspects, the second UE includes means for receiving, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE (e.g.,); and/or means for transmitting, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information (e.g., using controller/processor 280, transmit processor 264, TX MIMO processor 266, modem 254, antenna 252, memory 282, or the like). The means for the second UE to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
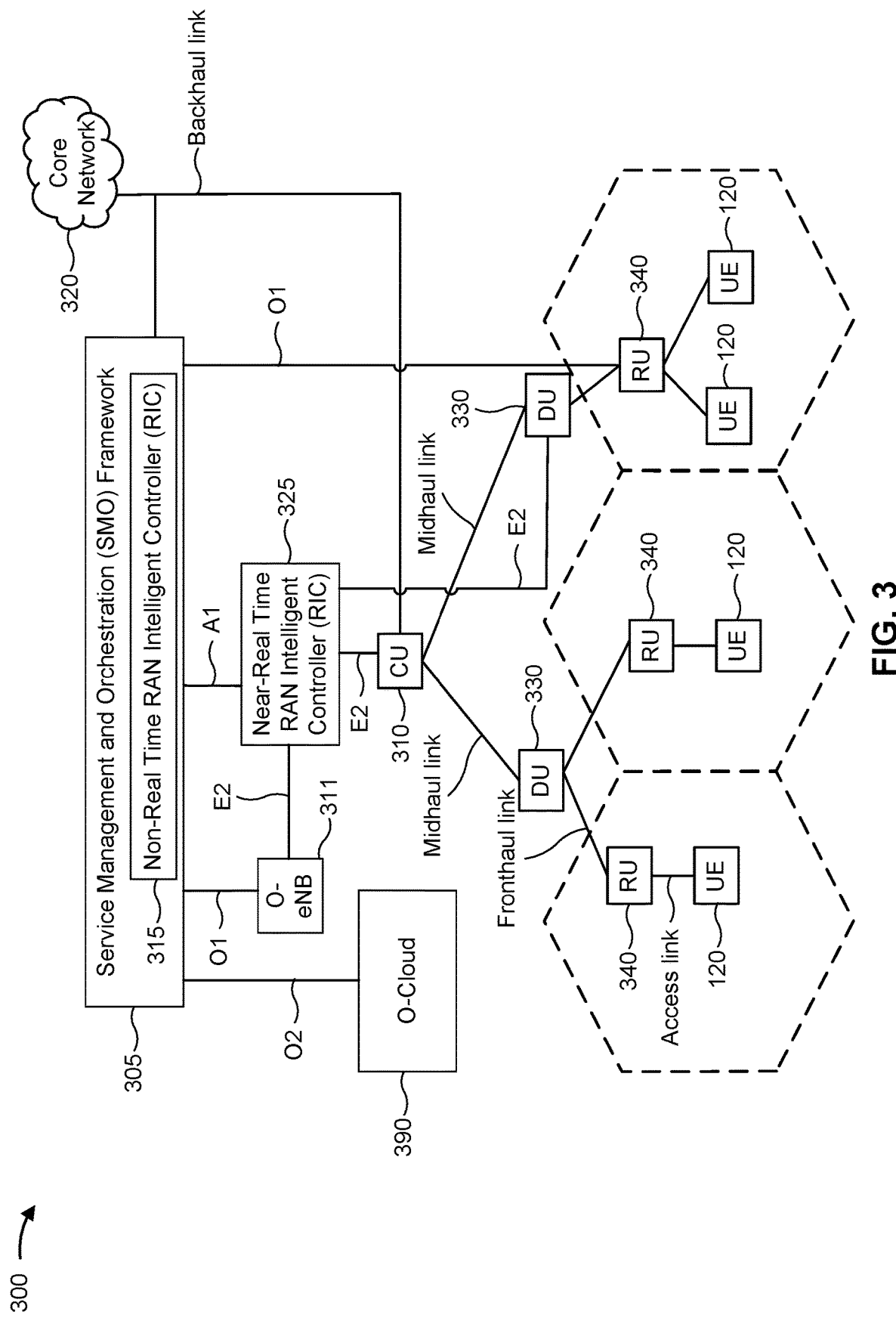
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML, models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A sidelink channel may have two modes of operation. In a first mode, a network node may manage sidelink resources. The network node may instruct a UE regarding which sidelink resources to use for sidelink communications. In a second mode, UEs may determine which sidelink resources to use for sidelink communications. In the second mode, in order to determine which sidelink resources are available for a Tx UE (e.g., a sidelink Tx UE) to use for transmitting sidelink data to an Rx UE (e.g., a sidelink Rx UE), the Tx UE may sense a channel for sidelink resource use by other nearby Tx UEs. Tx UEs may use sidelink control information (SCI) to reserve upcoming sidelink resources that are intended to be used for sidelink communications. By sensing the channel (e.g., receiving SCIs from the other nearby Tx UEs), the Tx UE may determine which upcoming sidelink resources are available for the Tx UE to use for the sidelink communications (e.g., sidelink resources that are not reserved by the other Tx UEs). Inter-UE coordination (IUC), or mode 2 resource selection, may be applicable for a sub-6 GHz frequency range (e.g., for sidelink without beamforming), but may be extended to sidelink with beamforming.

IUC may be associated with two different schemes. In a first scheme, Tx UEs may be enabled to (re)-select sidelink resources with assistance from nearby UEs. The nearby UEs may indicate which sidelink resources are preferred or not preferred, from a perspective of the nearby UEs, for the Tx UEs to use for sidelink communications. In the first scheme, assistance information (e.g., IUC information) may be transmitted by a UE triggered by a request from a Tx UE, or the assistance information (e.g., IUC information) may be transmitted triggered by some condition being satisfied at the UE. The first scheme may be based at least in part on request-triggered assistance information or condition-triggered assistance information. In a second scheme, after the Tx UE has selected sidelink resources and transmits a resource reservation, a nearby UE may indicate to the Tx UE that the UE has a conflict with one of the sidelink resources selected by the Tx UE.

In the first scheme, a condition for transmitting assistance information (e.g., IUC information) may be satisfied at a first UE (e.g., a sidelink Rx UE or UE-A) (or a UE that wants to receive in the future). To generate IUC information, the first UE may perform a channel sensing to determine resource reservations by nearby second UEs (e.g., nearby sidelink Tx UEs or UE-B). A second UE may receive IUC information from the first UE, and the second UE may perform a Tx resource (re)selection for its own transmission using the IUC information. Any UE that receives the IUC information and uses the IUC information for a Tx resource (re)selection may be one of the second UEs. The IUC information may be transmitted via a unicast, groupcast, or broadcast. For example, when the first UE transmits the IUC information via a unicast or groupcast, the first UE may be aware of the second UE. When the first UE transmits the IUC information via a broadcast, the first UE may not be aware of the second UE. The IUC information may indicate a set of resources that the first UE wants the second UE to use to transmit (e.g., preferred resources), and/or the IUC information may indicate a set of resources that the first UE does not want the second UE to use to transmit (e.g., non-preferred resources). Contents included in the IUC information (e.g., types of information) may be based at least in part on the first UE's implementation. In some cases, the first UE may be an intended Rx UE of the second UE's transmission, or may end up being the second UE's intended Rx UE. When the second UE receives an indication of preferred resources from the first UE, the second UE may attempt to use the preferred resources to transmit the data (e.g., as much as possible). When the second UE receives an indication of non-preferred resources from the first UE, the second UE may not use the non-preferred resources to transmit the data.

The first UE may prefer or not prefer certain sidelink resources, and the second UE may be informed as to which sidelink resources are preferred by the first UE and which sidelink resources are non-preferred by the first UE. For the first UE to determine whether a sidelink resource is preferred or not preferred, the first UE may need to know if other nearby Tx UEs (e.g., other second UEs) are reserving the resource, which may be determined by the first UE sensing a channel for reservation SCIs from any other nearby Tx UEs.

Figure 4:
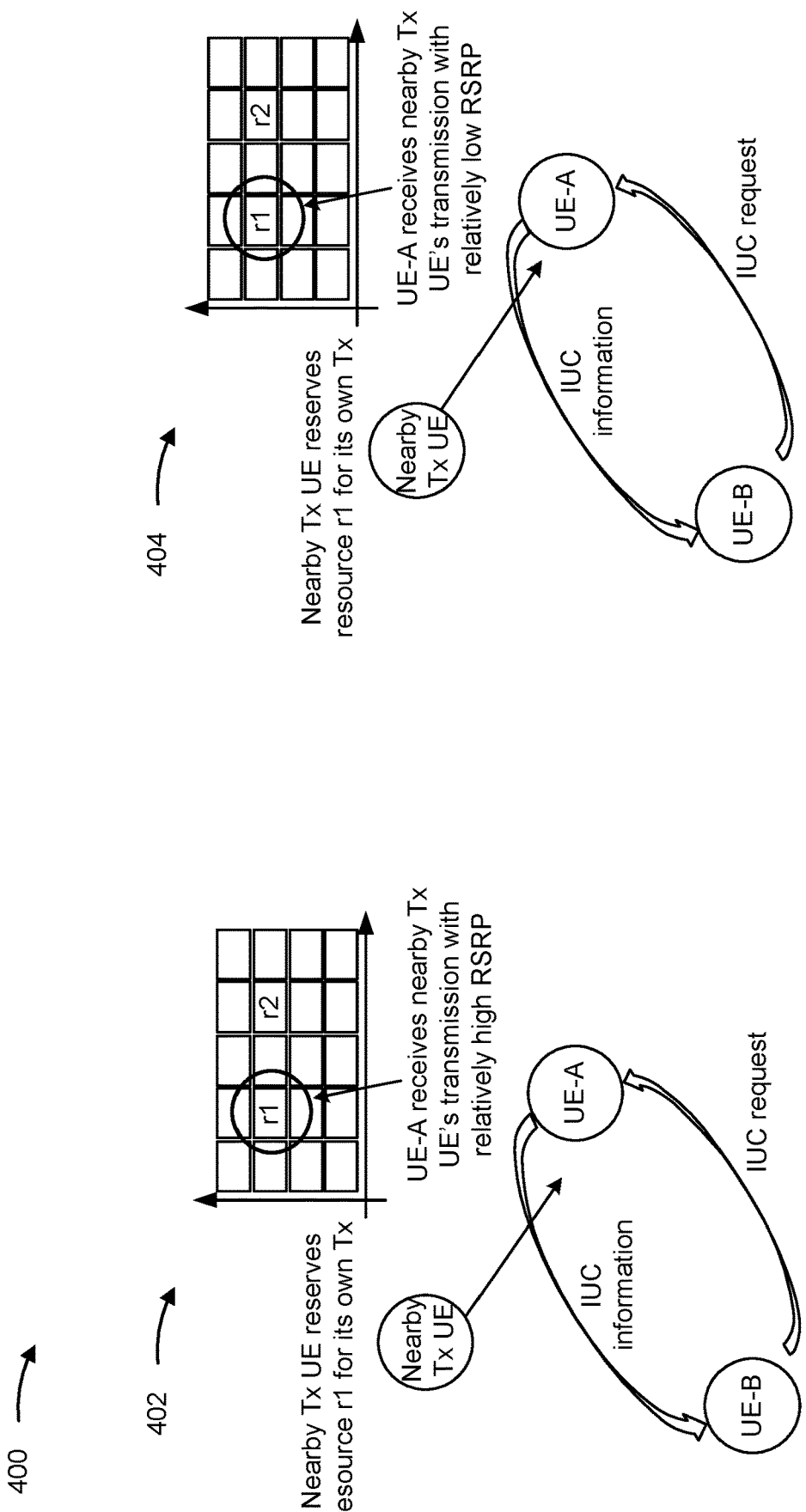
FIG. 4 is a diagram illustrating an example of preferred resources versus non-preferred resources, in accordance with the present disclosure.

FIG. 4 is a diagram illustrating an example 400 of preferred resources versus non-preferred resources, in accordance with the present disclosure.

As shown by reference number 402, a second UE (e.g., UE-B) may transmit an IUC request to a first UE (e.g., UE-A). A nearby Tx UE may reserve a first resource for its own transmission. The first UE may receive the nearby Tx UE's transmission with a relatively high RSRP. When the first UE is an intended Rx UE of the second UE, then the first UE may prefer that the second UE use a second resource to transmit, so that the first UE does not receive the second UE's signal and the nearby Tx UE's interfering signal in the same resource. The first UE may transmit, to the second UE, IUC information that indicates the second resource is a preferred resource.

As shown by reference number 404, a second UE may transmit an IUC request to a first UE. A nearby Tx UE may reserve a first resource for its own transmission. The first UE may receive the nearby Tx UE's transmission with a relatively low RSRP. When the first UE is an intended Rx UE of the nearby Tx UE, then the first UE may not prefer the second UE to use the first resource. When the second UE transmits using the first resource, the second UE's signal may interfere with the first UE's desired signal from the nearby Tx UE.

As indicated above, FIG. 4 is provided as an example. Other examples may differ from what is described with regard to FIG. 4.

Figure 5:
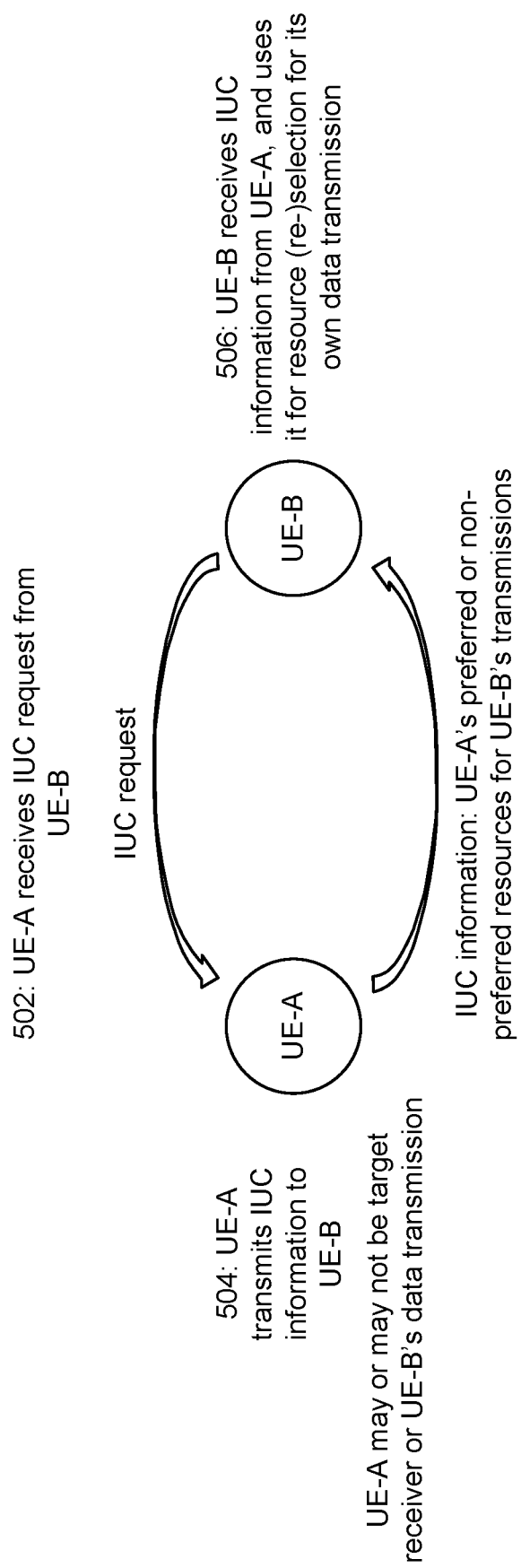
FIG. 5 is a diagram illustrating an example of an inter-UE coordination (IUC) information transmission, in accordance with the present disclosure.

FIG. 5 is a diagram illustrating an example 500 of an IUC information transmission, in accordance with the present disclosure.

As shown by reference number 502, in a first scheme associated with IUC, a first UE (e.g., UE-A) may receive an IUC request from a second UE (e.g., a Tx UE or UE-B). As shown by reference number 504, the first UE may transmit IUC information to the second UE. The first UE may or may not be a target receiver of the second UE's data transmission. The IUC information may indicate the first UE's preferred or non-preferred resources for the second UE's transmissions. As shown by reference number 506, the second UE may receive the IUC information from the first UE, and the second UE may use the IUC information to perform a resource selection (or reselection) for its own data transmission. An IUC information transmission in accordance with the first scheme may be triggered by a request, which may be enabled or disabled based at least in part on a configuration.

As indicated above, FIG. 5 is provided as an example. Other examples may differ from what is described with regard to FIG. 5.

An IUC information transmission may be triggered based at least in part on a condition. A resource pool level configuration may enable different alternatives. With respect to a trigger configuration, a first UE's implementation may determine whether or not to trigger an IUC information generation, where the IUC information generation may be triggered only when the first UE has data to be transmitted together with IUC information to the second UE. Some condition for the IUC information transmission may be satisfied at the first UE, and the first UE may transmit the IUC information to the second UE based at least in part on the condition being satisfied. With respect to an IUC information type (e.g., preferred resources or non-preferred resources), a resource set type to be provided by the IUC information may be determined by a first UE's implementation and may be indicated in the IUC information. With respect to a resource pool in which preferred resources or non-preferred resources are determined, the resource pool level configuration may configure the first UE's resource pool (e.g., the first UE's Rx resource pool) in which the first UE transmits the IUC information.

An IUC information transmission may be triggered based at least in part on a condition. With respect to a first UE's channel sensing parameters, for determining a preferred resource set, various parameter values may be (pre)-configured for a resource pool. When no (pre)-configuration is present, the first UE may determine by its implementation a $prio_{TX}$ of a second UE's intended transmission, an $L_{subCH}$ of the second UE's intended transmission, and a $P_{rsvp\_Tx}$ of the second UE's intended transmission. The first UE may determine by its implementation start/end times of a resource selection window. A (pre)-configuration of parameters for determining the preferred resource set in IUC information triggered by a condition may not be supported. The second UE's $prio_{TX}$ may be used to determine an RSRP threshold, which may be used to determine a resource availability (e.g., when an RSRP associated with a resource satisfies a threshold, the resource may not be available). The second UE's $L_{subCH}$ may indicate a quantity of subchannels that the second UE will use for transmissions. The second UE's $P_{rsvp\_Tx}$ may indicate a time interval between the second UE's periodic transmissions. The first UE may perform a PHY layer channel sensing based at least in part on $prio_{TX}$, $L_{subCH}$, $P_{rsvp\_Tx}$, and the start/end times of the resource selection window, and the first UE may determine which sidelink resources are available for the second UE to use for transmitting (e.g., to the first UE).

An IUC information transmission may be triggered based at least in part on a condition. With respect to a priority of IUC information, when configured, the priority of the IUC information may be a configured value. Otherwise, the priority of the IUC information may be based at least in part on a first UE implementation. When the IUC information is transmitted together with other data, a priority value of a multiplexed sidelink transmission may be a smallest priority value (e.g., highest priority) between the IUC information and the other data. With respect to a cast type, an IUC information transmission triggered by a condition may be supported for groupcast or broadcast for non-preferred resources, and an IUC information transmission triggered by a condition may be supported for unicast.

A first UE may determine a third UE's reserved resources based at least in part on a channel sensing. The first UE may be sensing (or receiving) for SCIs from nearby Tx UEs, which may include the third UE. The SCIs indicate upcoming resource reservations, and based at least in part on the reservations, the first UE may determine which resources are available. The SCIs may include time resource assignments (TRAs) and frequency resource assignments (FRAs) and resource reservation interval (RRI) fields, which may be used to indicate the upcoming resource reservations. The third UE's SCI may be directed to an intended Rx UE, and the first UE may happen to receive the second UE's SCI in this scenario. An available resource determination may be based at least in part on RSRPs of received SCIs, a priority of the first UE's transmission (e.g., when the first UE determines available resources for its own transmission), and/or priorities in the received SCIs.

Figure 6:
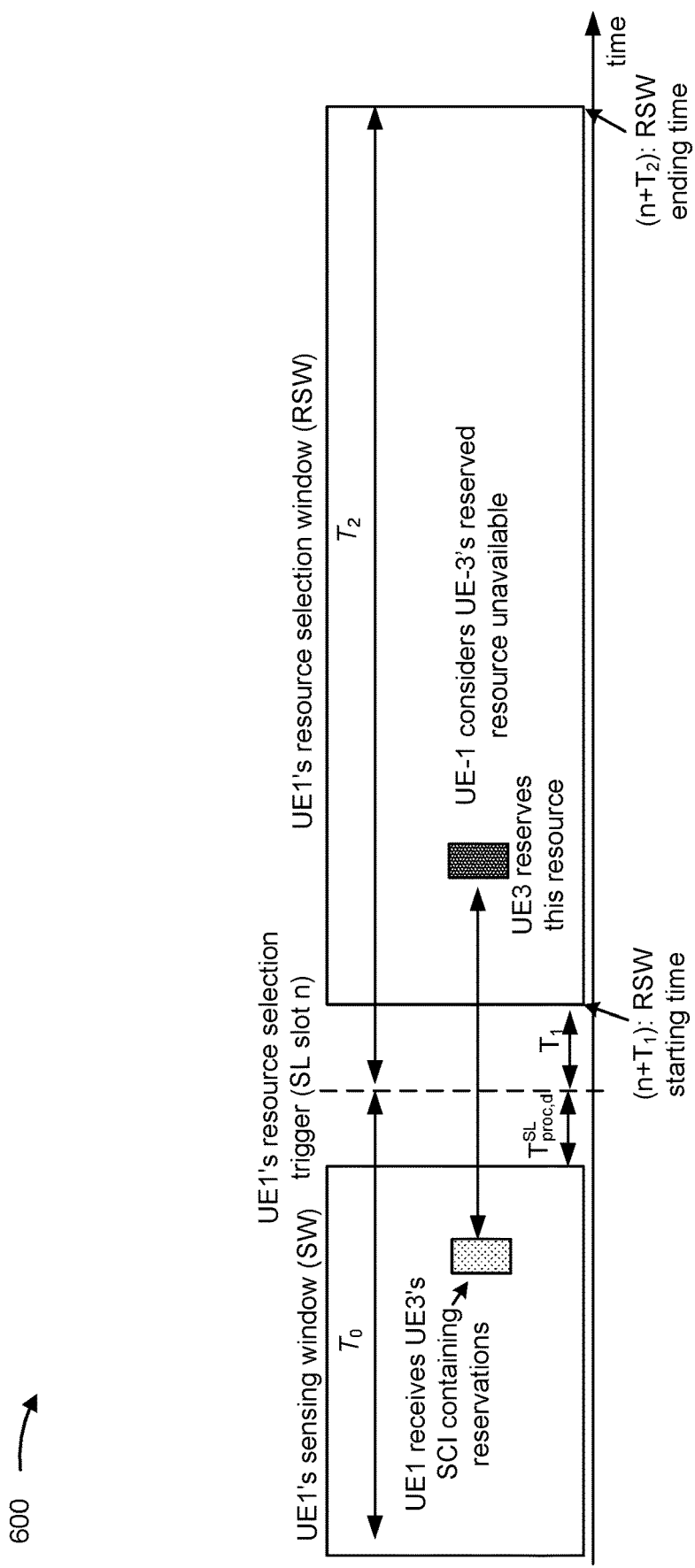
FIG. 6 is a diagram illustrating an example of channel sensing, in accordance with the present disclosure.

FIG. 6 is a diagram illustrating an example 600 of channel sensing, in accordance with the present disclosure.

As shown in FIG. 6, in channel sensing that is independent of IUC, a first UE (e.g., UE-1) may receive a third UE's (e.g., UE-3) SCI which indicates a resource reservation. The first UE may receive the third UE's SCI during the first UE's sensing window. The first UE's resource selection trigger may occur at a sidelink slot n. The SCI that indicates the third UE's resource reservation may reserve a resource in the first UE's resource selection window, which may be associated with a start time (e.g., $n+T_1$) and an end time (e.g., $n+T_2$). The first UE may determine which resources are reserved and which resources are available during the first UE's resource selection window. When the first UE receives the third UE's SCI with an RSRP that satisfies a threshold (e.g., the RSRP is greater than the threshold), which may depend on a priority indicated in the SCI or the first UE's Tx priority, then the first UE may consider the third UE's reserved resource as unavailable.

As indicated above, FIG. 6 is provided as an example. Other examples may differ from what is described with regard to FIG. 6.

When determining preferred resources, a first UE may determine (or assume) properties of a second UE's intended transmission, so that the first UE may perform a PHY layer channel sensing. The PHY layer channel sensing may be for determining available resources for the second UE's transmission. The first UE may determine the properties of the second UE's intended transmission because whether a resource is available or not available for a transmission may depend on properties of the transmission (e.g., an RSRP threshold may depend on a priority of the second UE's transmission). A Tx resource selection may be enabled based at least in part on an Rx UE channel sensing. An IUC request may not have a field for indicating whether or not the first UE is the intended Rx UE, but when the IUC request indicates the preferred resource, then the first UE is likely the intended Rx UE. When determining non-preferred resources, the first UE may not determine properties of the second UE's intended transmission. The first UE may measure RSRPs of nearby Tx UEs' transmissions and compute corresponding priorities and resource reservations. An Rx UE assisted Tx resource selection may be enabled. The first UE may still be the second UE's intended Rx UE, even when the IUC request from the second UE indicates the non-preferred resource.

With respect to a first condition for preferred resources, the preferred resources may be resource(s) excluding those overlapping with reserved resource(s) of other UEs identified by a first UE whose RSRP measurements satisfy an RSRP threshold (e.g., larger than the RSRP threshold). A set of resources preferred for a second UE's transmission may be a form of candidate single-slot resources. When an IUC information transmission is triggered by the second UE's request, the second UE may signal at least the various parameters to the first UE, which may include a priority value of a PSCCH/PSSCH, a quantity of subchannels of the PSCCH/PSSCH, a resource reservation interval, and/or start/end times of a resource selection window. An RSRP threshold increase may be applied, and a maximum limit of RSRP threshold increase may be defined. When the IUC information transmission is triggered by a condition, parameter values may be (pre)-configured for a resource pool for determining the preferred resource. When no (pre)-configuration is available, the first UE may determine by its implementation the parameter values, which may include parameter values for $prio_{TX}$, $L_{subCH}$, $P_{rsvp\_Tx}$. The first UE may determine by its implementation values of $n+T_1$ and $n+T_2$, which may define the resource selection window. With respect to a second condition for preferred resources, the first UE may be the second UE's intended receiver. The set of resources preferred for the second UE's transmission may be a form of candidate single-slot resources. The first UE may exclude candidate single-slot resource(s) belonging to slot(s) where the first UE, which is the intended receiver of the second UE, does not expect to perform a sidelink reception from the second UE due to a half-duplex operation.

A first UE may be a sensing UE, and a third UE may be a nearby Tx UE, which may transmit SCI indicating resource reservations. The first UE may determine which resources are preferred for a second UE's transmission within the first UE's resource selection window, which may be based at least in part on the SCI indicating the resource reservations. The first UE may be sensing (or receiving) for SCIs from nearby Tx UEs, which may include the third UE. The first UE's channel sensing for SCIs from the nearby Tx UEs may be triggered by a condition being satisfied at the first UE.

An example of a condition that triggers channel sensing for determining preferred resources for the second UE's transmission may be a detection of beam failure between the first UE and the second UE. The first UE may use the sensing parameters that the first UE has used to determine the preferred resources prior to the beam failure for the channel sensing triggered by the beam failure condition. The third UE's SCI may be directed to an intended Rx UE, and the first UE may happen to receive the third UE's SCI in this scenario. A preferred resource determination may be based at least in part on RSRPs of received SCIs, a priority of the second UE's transmission, and/or priorities in the received SCIs.

Figure 7:
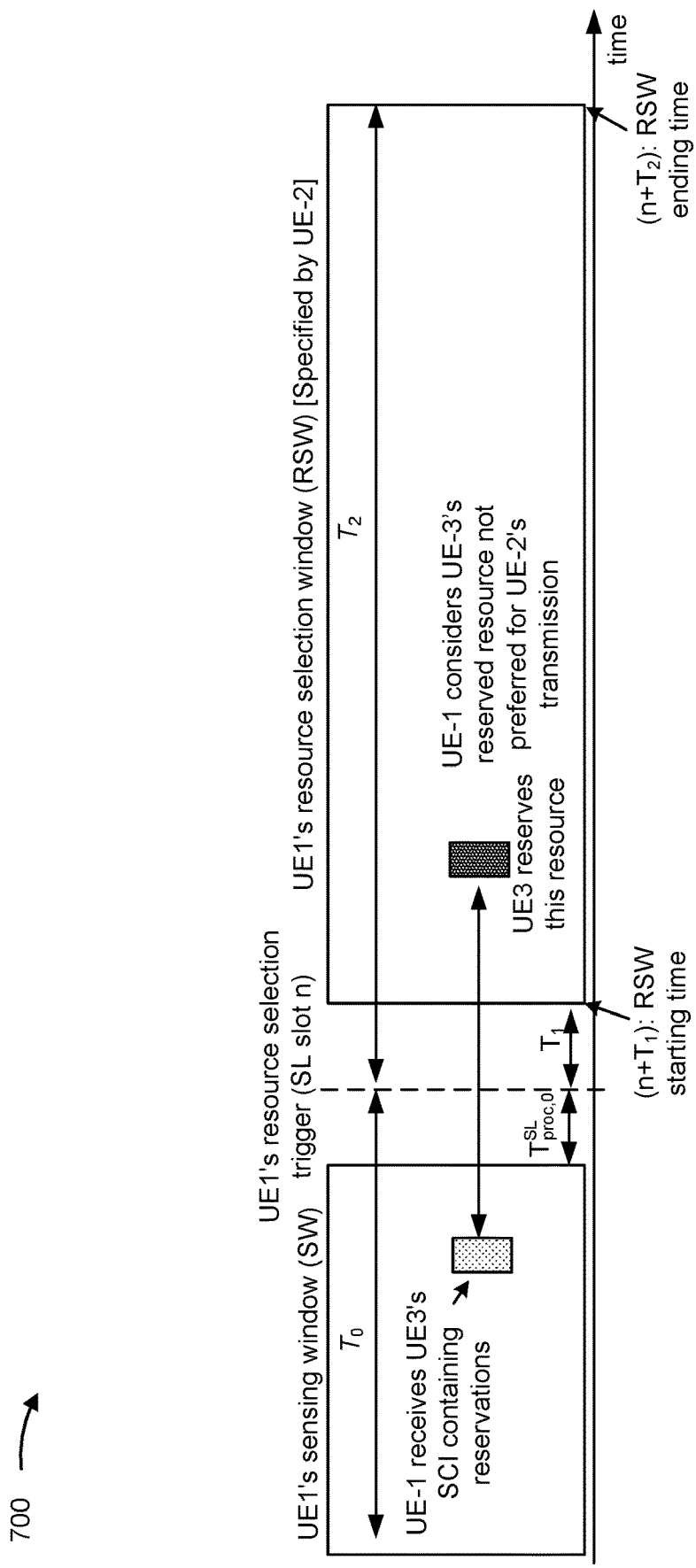
FIG. 7 is a diagram illustrating an example of determining preferred resources, in accordance with the present disclosure.

FIG. 7 is a diagram illustrating an example 700 of determining preferred resources, in accordance with the present disclosure.

As shown in FIG. 7, a first UE (e.g., UE-1) may receive a third UE's (e.g., UE-3) SCI which indicates a resource reservation. The first UE may receive the third UE's SCI during the first UE's sensing window. The first UE's resource selection trigger may occur at a sidelink slot n. The SCI that indicates the third UE's resource reservation may reserve a resource in the first UE's resource selection window, which may be specified by a second UE (e.g., UE-2), and which may be associated with a start time (e.g., $n+T_1$) and an end time (e.g., $n+T_2$). The first UE may determine which resources are preferable for the second UE's transmission during the first UE's resource selection window. When the first UE receives the third UE's SCI with an RSRP that satisfies a threshold (e.g., the RSRP is greater than the threshold), which may depend on a priority indicated in the SCI and a priority indicated in the second UE's IUC request, then the first UE may consider the third UE's reserved resource as not preferable for the second UE's transmission. In other words, the first UE may not prefer the second UE to use the third UE's reserved resource for the second UE's transmission, and other resources in the first UE's resource selection window may be preferred.

As indicated above, FIG. 7 is provided as an example. Other examples may differ from what is described with regard to FIG. 7.

With respect to a first condition for non-preferred resources, in a first option, reserved resource(s) of other UE(s) may be identified by a first UE whose RSRP measurement is larger than a (pre)configured RSRP threshold, which may be determined by at least a priority value indicated by SCI of the UE(s). In the first option, the first UE may be a second UE's intended Rx UE. The first UE may not want the second UE to transmit in the non-preferred resources in which the first UE can receive other UE's transmission with RSRP larger than the (pre)configured RSRP threshold because, if the second UE does transmit in those non-preferred resources, the second UE's transmission may be interfered by other UEs' transmissions. The first UE may be less likely to receive the second UE's transmission due to interference from the other UEs if the RSRP of the other UEs' transmissions may be relatively high. Thus, the first UE may not want the second UE to transmit in the same resource as the other UE in which the RSRP of the other UE's transmission is larger than the RSRP threshold. In a second option, the reserved resource(s) of the other UE(s) may be identified by the first UE whose RSRP measurement is smaller than the (pre)configured RSRP threshold, which may be determined by at least the priority value indicated by the SCI of the UE(s) when the first UE is a destination of a transport block transmitted by the UE(s). In the second option, the first UE may be the other UEs' intended Rx UE. The first UE may not want the second UE to transmit in the reserved resources of the other UEs because, in these resources, the first UE may be receiving transmissions from the other UEs. If the RSRP of the other UEs' transmissions is lower than the (pre)configured RSRP threshold, the first UE may not want the second UE to transmit in the same resource. Otherwise, the second UE may cause interference to the first UE's reception. With respect to a second condition for non-preferred resources, the first UE may be the second UE's intended receiver. In some resource(s) (e.g., slot(s)), the first UE, when it is the intended receiver of the second UE, may not expect to perform a sidelink reception from the second UE due to a half-duplex operation. Under the second condition, those resources in which the first UE does not expect to receive from the second UE may be the first UE's non-preferred resources.

Figure 8:
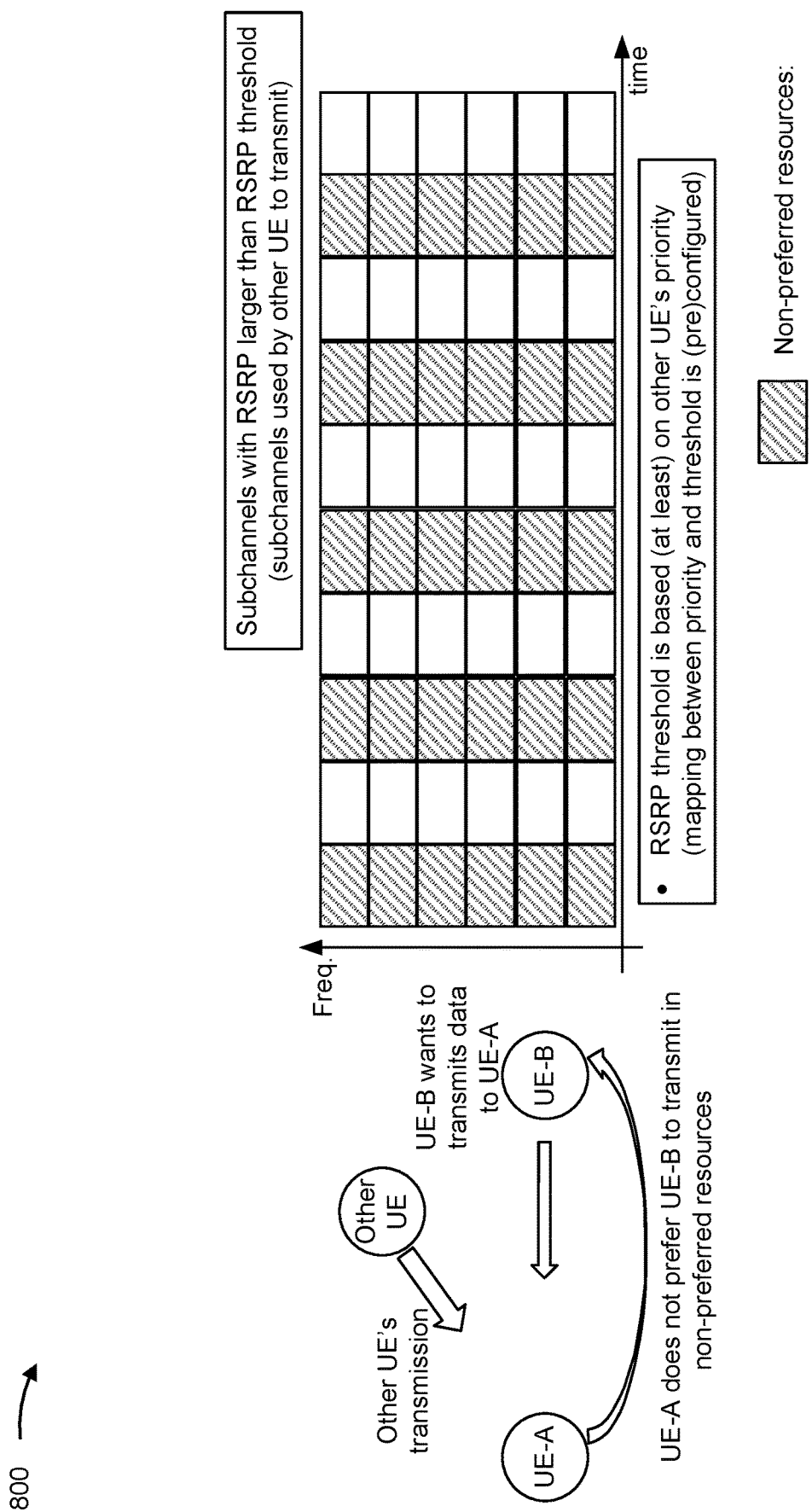
FIG. 8 is a diagram illustrating an example of non-preferred resources, in accordance with the present disclosure.

FIG. 8 is a diagram illustrating an example 800 of non-preferred resources, in accordance with the present disclosure.

As shown in FIG. 8, in a first option, a first UE (e.g., UE-A) may be a second UE's (e.g., UE-B) intended Rx UE. The second UE may have data to transmit to the first UE. One other UE may perform a transmission on certain resources (shaded resources in FIG. 8), which may correspond to subchannels with RSRP measurements larger than an RSRP threshold (e.g., subchannels used by the other UE to transmit). The RSRP threshold may be based at least in part on the other UE's priority (e.g., a mapping between priority and the RSRP threshold may be (pre)-configured). The first UE may prefer that the second UE does not transmit using these resources (shaded resources in FIG. 8), since such resources may be considered to be non-preferred resources due to the RSRP measurements being larger than the RSRP threshold.

As indicated above, FIG. 8 is provided as an example. Other examples may differ from what is described with regard to FIG. 8.

Figure 9:
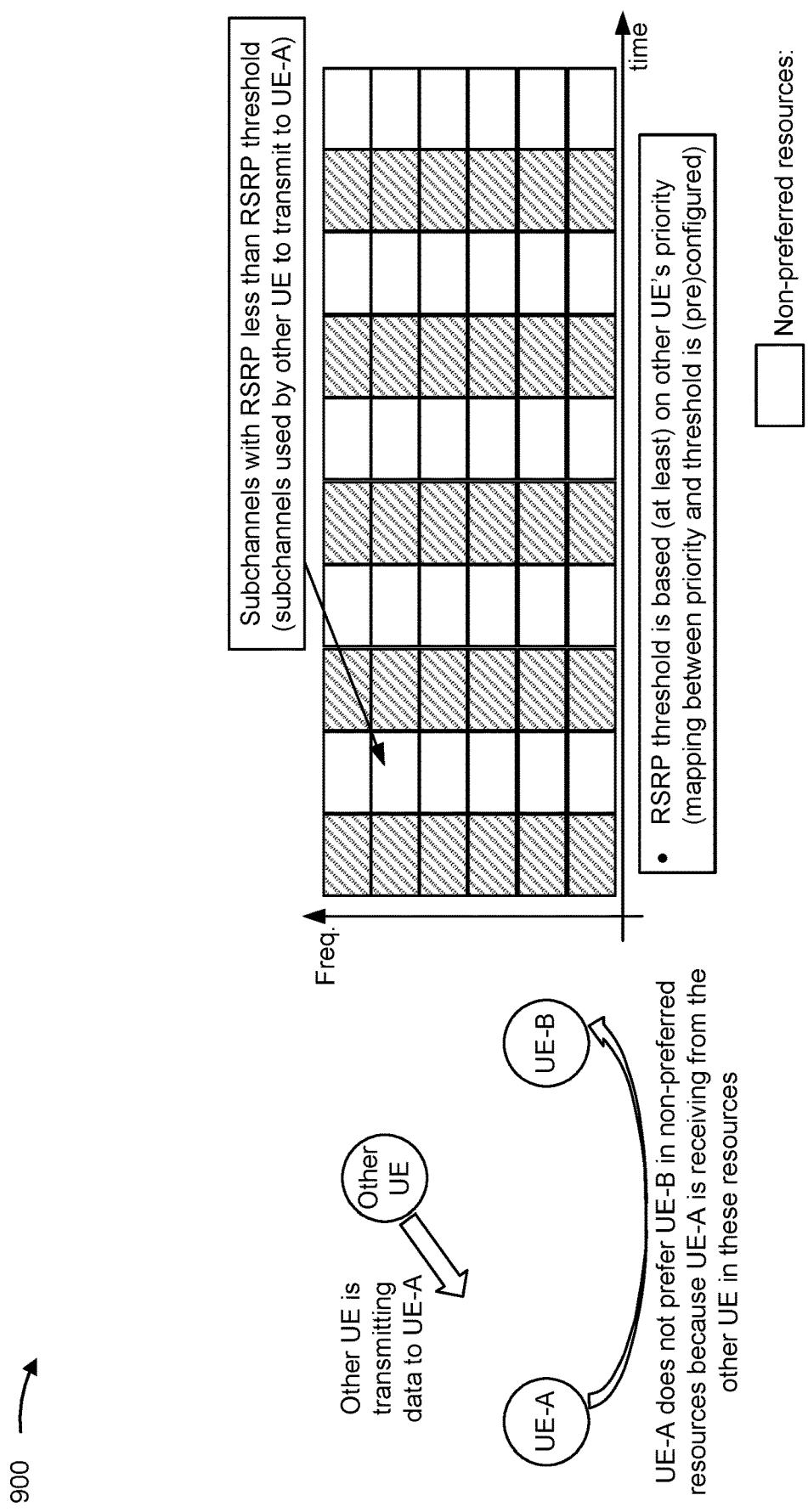
FIG. 9 is a diagram illustrating an example of non-preferred resources, in accordance with the present disclosure.

FIG. 9 is a diagram illustrating an example 900 of non-preferred resources, in accordance with the present disclosure.

As shown in FIG. 9, in a second option, a first UE (e.g., UE-A) may not be a second UE's (e.g., UE-B) intended Rx UE. One other UE may have data to transmit to the first UE. The other UE may perform a transmission on certain resources (non-shaded resources in FIG. 9), which may correspond to subchannels with RSRP measurements less than an RSRP threshold (e.g., subchannels used by the other UE to transmit to the first UE). The RSRP threshold may be based at least in part on the other UE's priority (e.g., a mapping between priority and the RSRP threshold may be (pre)-configured). The first UE may not prefer the second UE to transmit using these resources because the first UE may be receiving from the other UE in these resources. The first UE may not want the second UE to transmit in these resources, which may not exceed the RSRP threshold.

As indicated above, FIG. 9 is provided as an example. Other examples may differ from what is described with regard to FIG. 9.

A medium access control control element (MAC-CE) may be used to convey IUC information. The MAC-CE may indicate a providing/requesting indicator, resource combination(s), first resource location(s), a reference slot location, a resource set type, and/or lowest subchannel indices for the first resource location of each time resource indicator value (TRIV). A maximum value of N resource combinations to be conveyed in the IUC information may be bounded so that a total payload size of the IUC information does not exceed a size of a transport block including the MAC-CE, where N may refer to a quantity of resources indicated in the IUC information conveyed via the MAC-CE. A value of N may be separately indicated in the IUC information, and various fields associated with the IUC information may be inserted into the MAC-CE and may have corresponding field sizes in the MAC-CE. For a slot offset that is (pre)-configured to indicate the first resource location of each TRIV with respect to a reference slot, a granularity of the slot offset may be one logical slot. A (pre)-configured maximum value of the slot offset may be up to 8000. When both an SCI format 2-C and a MAC-CE are used as a container of IUC information, a maximum value of the slot offset may be 255. When only a MAC-CE is used as a container of IUC information, a maximum value of the slot offset may be the (pre)-configured maximum value.

A second UE, after receiving IUC information, may perform a Tx resource selection based at least in part on a sensing result and the IUC information, or only on the IUC information (e.g., preferred resources). The second UE may receive an indication of preferred resources in the IUC information. The second UE may perform a selection based only on the IUC information, which may correspond to an Rx UE sensing based Tx resource selection. The second UE may perform a selection based at least in part on the second UE's sensing and the IUC information, which may correspond to an Rx UE assisted Tx resource selection. The second UE's MAC entity may select Tx resources based at least in part on the sensing result and the IUC information, where the IUC information may be directed to the second UE's MAC layer. The second UE may receive an indication of non-preferred resources in the IUC information, which may correspond to a selection based at least in part on the second UE's sensing and the IUC information. The selection may be an Rx UE assisted Tx resource selection. The second UE's PHY layer may eliminate non-preferred resources from the sensing result before reporting to the MAC layer, where the IUC information may be directed to the second UE's PHY layer.

The second UE may perform various behaviors based at least in part on a reception of IUC information, with regards to a preferred resource set. In a first option, the second UE's resource(s) to be used for its transmission resource (re-)selection may be based at least in part on both the second UE's sensing result (if available) and received IUC information. The second UE may use, in a resource (re-)selection, resource(s) belonging to the preferred resource set in combination with its own sensing result. The second UE may use, in the resource (re-)selection, resource(s) not belonging to the preferred resource set when certain condition(s) are satisfied. The first option may be supported when the second UE performs a sensing/resource exclusion. A MAC layer of the second UE may select resources using $S_A$ (sensing result) and the received preferred resource set. The MAC layer may select resources for transmissions within an intersection of S A and the preferred resource set until selecting a resource within the intersection becomes not possible. When a quantity of selected resources is smaller than a required quantity of transmissions for a transport block, the MAC layer may select resources for remaining transmissions outside the intersection but inside $S_A$. In a second option, the second UE's resource(s) to be used for a transmission resource (re-)selection may be based only on received IUC information. The second UE may use, in a resource (re-)selection, resource(s) belonging to the preferred resource set. The second option may be supported at least when the second UE does not support a sensing/resource exclusion.

For the second UE's behavior when the second UE receives multiple preferred resource sets from different first UEs, the second UE may use each received preferred resource set for its resource selection for each transport block to be transmitted to each first UE providing the preferred resource set. For the second UE's behavior when the second UE receives multiple preferred resource sets from the same first UE, the second UE may use one or multiple preferred resource sets in a resource (re)selection based at least in part on an implementation.

The second UE may perform various behaviors based at least in part on a reception of IUC information, with regards to a non-preferred resource set. The second UE's resource(s) to be used for a transmission resource (re-)selection may be based at least in part on both the second UE's sensing result (if available) and received IUC information. A PHY layer at the second UE may exclude, in its resource (re-)selection, candidate single-slot resource(s) overlapping with the non-preferred resource set. When a quantity of candidate single-slot resources after applying the received non-preferred resource set cannot meet a certain requirement, a second UE's implementation may define whether to take the received non-preferred resource set in a resource selection to meet this requirement.

For the second UE's behavior when the second UE receives both a single preferred resource set and a single non-preferred resource set from different first UEs, a second UE's implementation may define whether to use one or multiple resource sets in a resource (re)selection. For the second UE's behavior when the second UE receives both a single preferred resource set and a single non-preferred resource set from the same first UE, a second UE's implementation may define whether to use one or multiple resource sets in a resource (re)selection. The second UE's behavior may be defined when the second UE receives multiple non-preferred resource sets from different first UEs. The second UE's behavior may be defined when the second UE receives multiple non-preferred resource sets from the same first UE.

When using a mmWave channel (e.g., FR2, which may correspond to 28 GHz) for sidelink communications, UEs may use beamforming. Otherwise, a signal attenuation may be too large and may result in a low signal-to-noise-ratio (SNR) at an Rx UE. Beamforming may involve directing a signal to propagate in a desired direction, where the desired direction may be a propagation path from a Tx UE to an Rx UE that results in a best SNR at the Rx UE (e.g., when interference is not an issue). A pair of the Tx UE and the Rx UE may have multiple signal propagation paths, and the pair may use only one signal propagation path with beamforming (e.g., depending on a UE beamforming capability).

Figure 10:
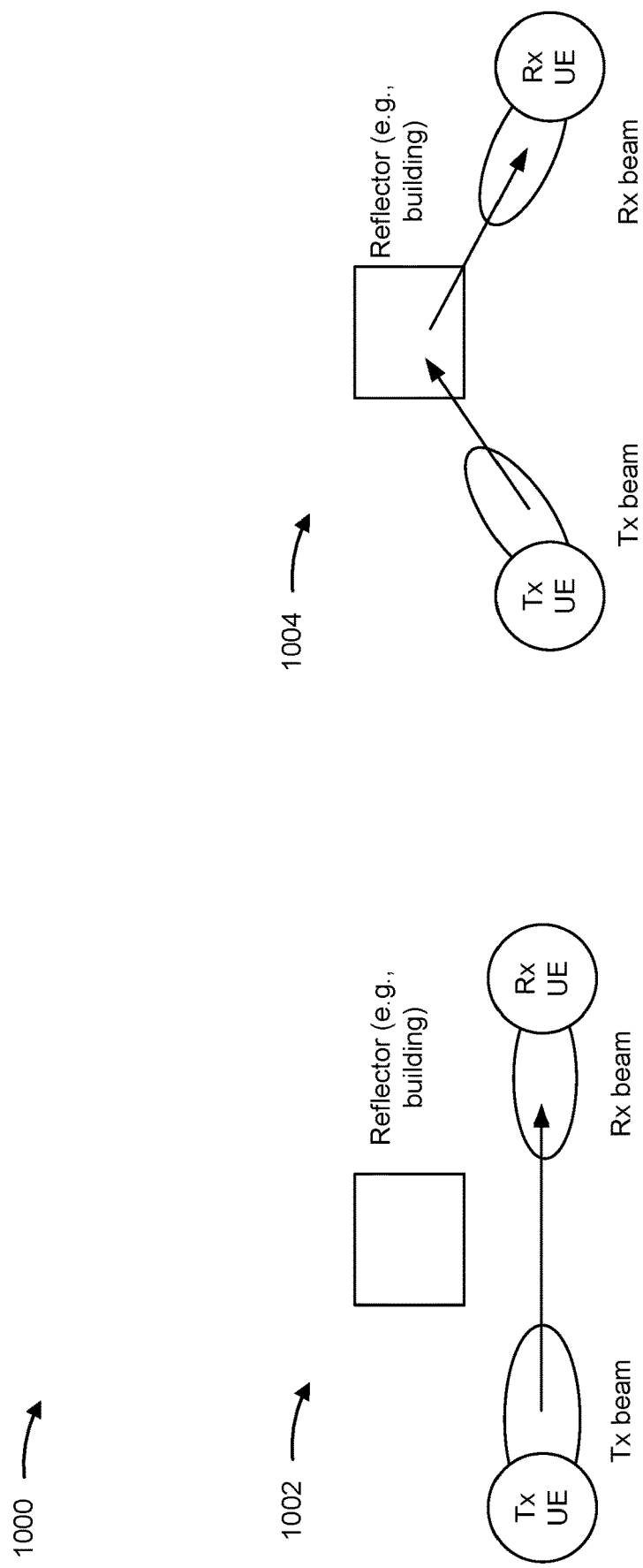
FIG. 10 is a diagram illustrating an example of beamforming, in accordance with the present disclosure.

FIG. 10 is a diagram illustrating an example 1000 of beamforming, in accordance with the present disclosure.

As shown by reference number 1002, a Tx UE may transmit using a Tx beam, and an Rx UE may receive using an Rx beam. The Tx beam and the Rx beam may avoid a reflector (e.g., a building)

As shown by reference number 1004, a Tx UE may transmit using a Tx beam, and an Rx UE may receive using an Rx beam. A reflector (e.g., a building) may be in a path associated with the Tx beam and the Rx beam. For example, the Tx UE may transmit a signal using the Tx beam, the signal may be reflected off of the reflector, and the signal may be received by the Rx UE using the Rx beam.

As indicated above, FIG. 10 is provided as an example. Other examples may differ from what is described with regard to FIG. 10.

A transmission of IUC information triggered by a condition may be supported for groupcast or broadcast for non-preferred resources. For a broadcast, a first UE may not know which sidelink UE will be a second UE. For a groupcast, the second UE may correspond to one or more UEs in a groupcast group. UEs in the groupcast may be aware of which resources (e.g., time, frequency, and beam) are to be used for communicating IUC information with each other. A transmission of IUC information triggered by a condition may be supported for unicast. The first UE may be aware of the second UE, and both the first UE and the second UE may know which resources (e.g., time and frequency) to use for communicating IUC information with each other. A transmission of IUC information indicating preferred resources may be supported for unicast.

When a second UE receives IUC information from a first UE, the second UE may need to know to which of its Tx beams the preferred or non-preferred resources indicated in the IUC information triggered by a condition at the first UE applies. In other words, the second UE may be unaware of whether to apply the preferred or non-preferred resources to one Tx beam or another Tx beam, where the preferred or non-preferred resources may be indicated by the IUC information, and the IUC information may be triggered by the condition at the first UE.

Figure 11:
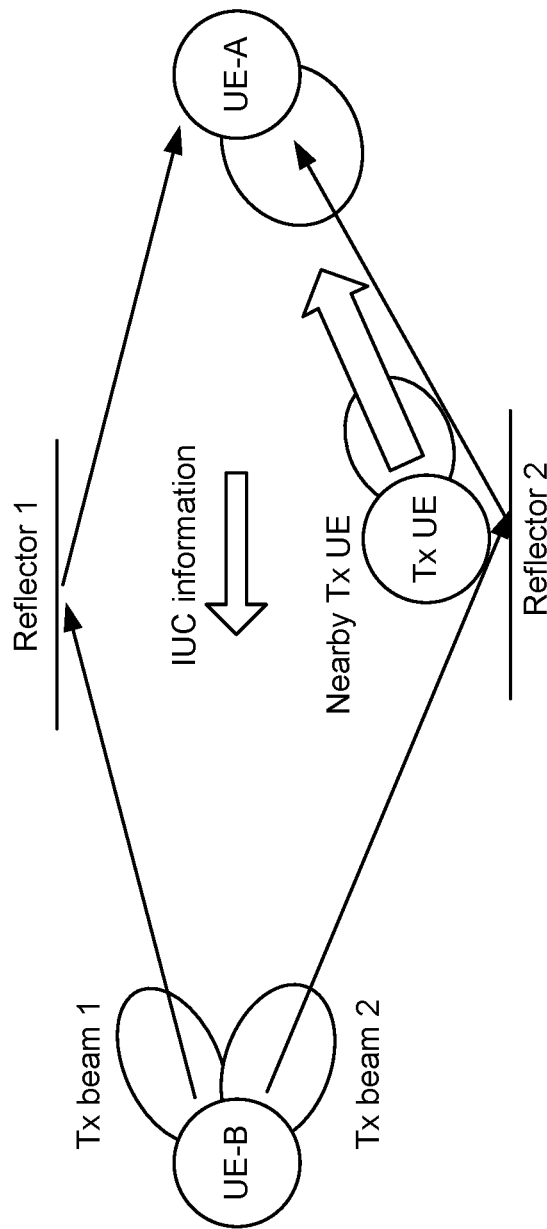
FIGS. 11-12 are diagrams illustrating examples of UEs with multiple beams, in accordance with the present disclosure.

FIG. 11 is a diagram illustrating an example 1100 of UEs with multiple beams, in accordance with the present disclosure.

As shown in FIG. 11, a second UE (e.g., UE-B) may have a first Tx beam and a second Tx beam. The second UE may receive, from a first UE (e.g., UE-A), IUC information which indicates preferred resources or non-preferred resources. The second UE may have two propagation paths for the first Tx beam and the second Tx beam. A first propagation path may be associated with a first reflector. The second propagation path may be associated with a second reflector. The first UE may be a Tx UE's intended Rx UE. The first UE may not prefer the second UE to transmit in the same resource as the Tx UE (e.g., a nearby Tx UE) because then the second UE may interfere with a designated signal from the Tx UE. The first UE may not want the second UE to transmit on the second Tx beam in non-preferred resources, which may otherwise cause interference to the designated signal from the Tx UE. However, the second UE may be unaware of the Tx beam to which the non-preferred resources applies.

As indicated above, FIG. 11 is provided as an example. Other examples may differ from what is described with regard to FIG. 11.

When a first UE performs a channel sensing to determine preferred or non-preferred resources for a second UE's transmission, the first UE may be unaware of which beam to use. For example, the first UE may have a first beam and a second beam, and the first UE may be unaware of whether to perform the channel sensing to determine the preferred or non-preferred resources for the second UE's transmission using the first beam or the second beam.

Figure 12:
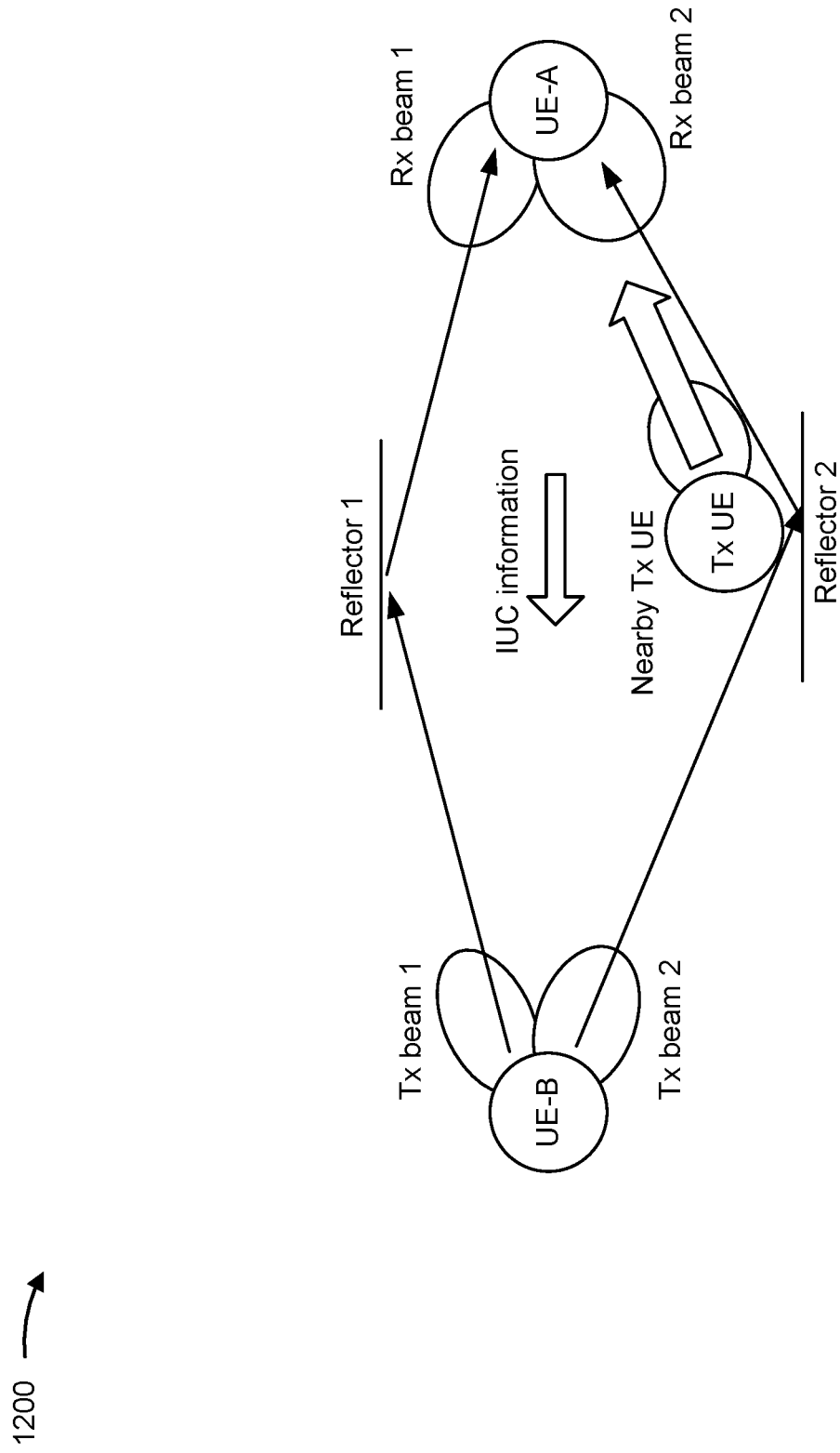

FIG. 12 is a diagram illustrating an example 1200 of UEs with multiple beams, in accordance with the present disclosure.

As shown in FIG. 12, a first UE (e.g., UE-A) may have a first Rx beam and a second Rx beam. A second UE (e.g., UE-B) may have a first Tx beam and a second Tx beam. The first Rx beam and the first Tx beam may form a first beam pair, and the second Rx beam and the second Tx beam may form a second beam pair. The second UE may receive, from a first UE (e.g., UE-A), IUC information which indicates preferred resources or non-preferred resources. The second UE may have two propagation paths for the first Tx beam and the second Tx beam. A first propagation path may be associated with a first reflector. The second propagation path may be associated with a second reflector. The first UE may be the second UE's intended Rx UE. The first UE may not prefer the second UE to transmit in the same resource as a Tx UE (e.g., a nearby Tx UE) because then a desired signal from the second UE may be interfered with by an undesired signal from the Tx UE. The first UE may not be configured to indicate to the second UE that the IUC information applies to the first Tx beam.

As indicated above, FIG. 12 is provided as an example. Other examples may differ from what is described with regard to FIG. 12.

In various aspects of techniques and apparatuses described herein, a first UE may indicate to a second UE, via an explicit approach or an implicit approach, that preferred resources or non-preferred resources of the first UE are to be applied to a Tx beam of the second UE. In the explicit approach, the first UE may determine, based at least in part on a channel sensing using an Rx beam of the first UE, the preferred resources or the non-preferred resources of the first UE for a sidelink transmission by the second UE. The first UE may transmit, to the second UE, IUC information. The IUC information may indicate the Tx beam of the second UE to which the preferred or non-preferred resources apply. That is, the preferred (non-preferred) resources are the resources that the first UE prefers (does not prefer) the second UE to use when transmitting using the indicated Tx beam of the second UE. The indicated Tx beam of the second UE may be associated with the Rx beam of the first UE. The IUC information may indicate the preferred resources or the non-preferred resources of the first UE. The preferred resources or the non-preferred resources of the first UE may be applied to the Tx beam of the second UE indicated in the IUC information. In the implicit approach, the first UE may determine, using the Rx beam of the first UE and based at least in part on the channel sensing, the preferred resources or the non-preferred resources of the first UE for the sidelink transmission by the second UE (e.g., any UE such as the second UE). The first UE may transmit, using a Tx beam of the first UE that is associated with the Rx beam of the first UE, the IUC information that indicates the preferred resources or the non-preferred resources of the first UE. The Tx beam of the first UE that is associated with the Rx beam of the first UE may be the same beam or directed at the same spatial angle or quasi co-located. Two (Tx and Tx, or Tx and Rx, or Rx and Rx) beams (spatial filters) of a wireless device that are quasi co-located may be identical beams (spatial filters), e.g., two are the same beam (spatial filter). The first UE, when transmitting the IUC information, may not direct the IUC information to any particular UE.

In some aspects, the IUC information from the first UE may indicate, either explicitly or implicitly, the Tx beam of the second UE to which the preferred resources or the non-preferred resources are applicable. Further, the Rx beam of the first UE used to perform the channel sensing may be associated with (e.g., may form a logical relationship with) the Tx beam of the second UE that the first UE indicates to the second UE to which the preferred resources or the non-preferred resources are applicable. That is, the first UE may be able to communicate with the second UE using the Rx beam of the first UE used for channel sensing and the indicated Tx beam of the second UE. As a result, the second UE may be able to determine to which Tx beam of the second UE the IUC information from the first UE applies, which may prevent interference from being caused by the first UE and/or the second UE.

Figure 13:
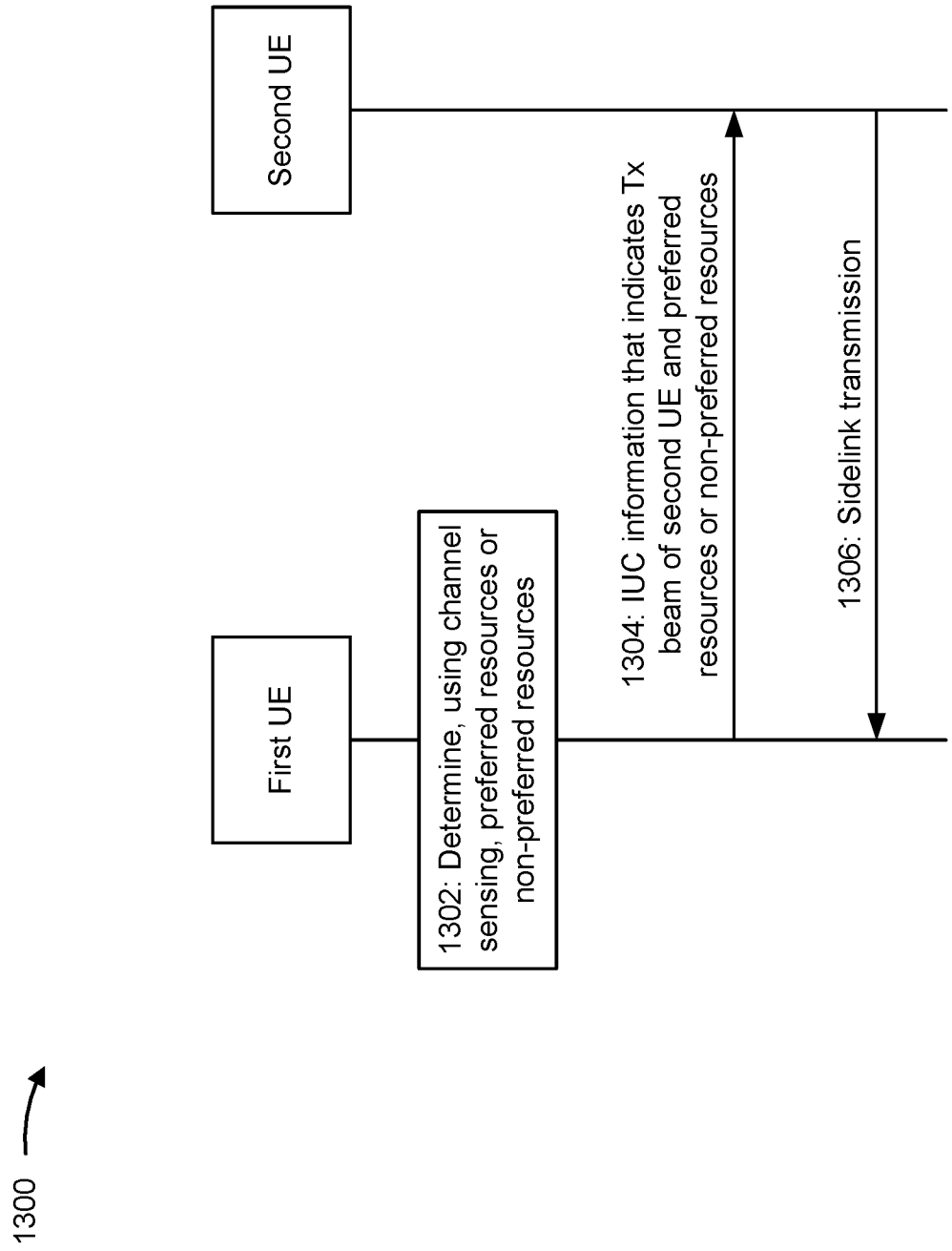
FIGS. 13-16 are diagrams illustrating examples associated with transmitting IUC information based at least in part on beamforming, in accordance with the present disclosure.

FIG. 13 is a diagram illustrating an example 1300 associated with transmitting IUC information based at least in part on beamforming, in accordance with the present disclosure. As shown in FIG. 13, communication may occur between a first UE (e.g., UE 120*a*) and a second UE (e.g., UE 120*e*). In some aspects, the first UE and the second UE may be included in a wireless network, such as wireless network 100.

As shown by reference number 1302, the first UE (e.g., UE-A) may determine, based at least in part on a channel sensing using an Rx beam of the first UE, preferred resources or non-preferred resources of the first UE for a sidelink transmission by a second UE (e.g., UE-B). The Rx beam of the first UE may be associated with a transmission configuration indicator (TCI) state or a spatial relation or spatial filter. The first UE may perform the channel sensing using the Rx beam of the first UE.

As shown by reference number 1304, the first UE may transmit, via a Tx beam of the first UE, IUC information. The IUC information may indicate the Tx beam of the second UE and the preferred resources or the non-preferred resources of the first UE. The Tx beam of the second UE may be associated with a TCI state or a spatial relation or spatial filter. The Rx beam of the first UE used for channel sensing may be quasi co-located with a second beam of the first UE that is associated with the Tx beam of the second UE indicated in the IUC information. In other words, the Rx beam that the first UE uses for the channel sensing may be quasi co-located with the second beam of the first UE that is actually associated (e.g., paired) with the Tx beam of the second UE, as indicated in the IUC information. In some cases, the Rx beam of the first UE and the second beam of the first UE may be the same beam. The second UE may receive, from the first UE, the IUC information via an Rx beam of the second UE.

In some aspects, first UE may transmit the IUC information via a MAC-CE or SCI. The MAC-CE or the SCI may include a field to indicate the Tx beam of the second UE for which the preferred resources or the non-preferred resources of the first UE is applicable. The first UE may transmit the IUC information based at least in part on a condition being satisfied at the first UE, as opposed to transmitting the IUC information based at least in part on receiving an IUC request from the second UE.

As shown by reference number 1306, the second UE may transmit a sidelink transmission based at least in part on the IUC information. The second UE may transmit the sidelink transmission using the preferred resources indicated in the IUC information using the indicated Tx beam or another Tx beam that is quasi co-located with the indicated Tx beam or that is directed at the same spatial angle as the indicated Tx beam. The second UE may perform the sidelink transmission by not using the non-preferred resources indicated in the IUC information. The second UE may transmit the sidelink transmission to the first UE or to another UE.

In some aspects, in an explicit approach, the IUC information may include a new field. The first UE may use the new field to indicate a Tx beam (or TCI state or spatial relation or spatial filter) from which the second UE may determine the second UE's Tx beam (or TCI state or spatial relation or spatial filter) to which the preferred resources or the non-preferred resources indicated in the IUC information are applied. In other words, the new field may indicate the Tx beam, and the second UE may determine that the preferred resources or the non-preferred resources indicated in the IUC information are to be applied to the Tx beam. The first UE may use an Rx beam that is used to establish a beamformed link with the Tx beam (or TCI state or spatial relation) of the second UE indicated in the new field of the IUC information to perform the channel sensing.

In some aspects, a beamformed link may be established between the first UE and the second UE. The second UE may transmit a reference signal via the Tx beam of the second UE based at least in part on the established beamformed link, and the first UE may receive the reference signal via the Rx beam of the first UE. The reference signal may be associated with a TCI state or a spatial relation. In some aspects, the explicit approach may be applicable to a scenario in which the first UE and the second UE have established the beamformed link between the first UE and the second UE, and one UE is transmitting the reference signal and the other UE is receiving the reference signal. The TCI state or the spatial relation may refer to the reference signal. In other words, the reference signal may be associated with the TCI state or the spatial relation. When one UE is indicating a beam (or TCI state or spatial relation) to the other UE, the one UE may signal to the other UE that the one UE wants the other UE to transmit or receive a signal using the beam used to either transmit or receive the reference signal associated with the TCI state or the spatial relation.

As indicated above, FIG. 13 is provided as an example. Other examples may differ from what is described with regard to FIG. 13.

Figure 14:
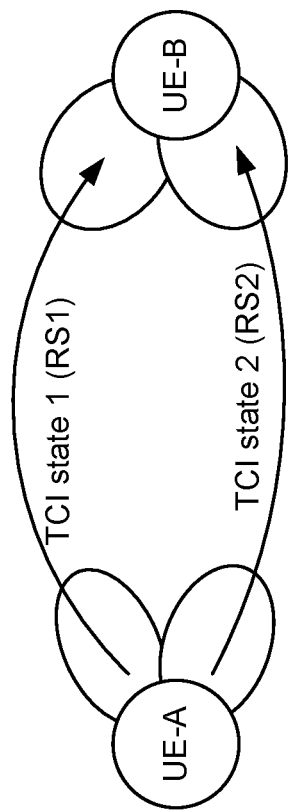

FIG. 14 is a diagram illustrating an example 1400 associated with transmitting IUC information based at least in part on beamforming, in accordance with the present disclosure.

As shown in FIG. 14, a first UE (e.g., UE-A) may be associated with a first TCI state and a second TCI state. A second UE (e.g., UE-B) may be associated with the first TCI state and the second TCI state. The first TCI state may be associated with a first Tx/Rx beam of the first UE and a first Tx/Rx beam of the second UE. The second TCI state may be associated with a second Tx/Rx beam of the first UE and a second Tx/Rx beam of the second UE. When one beam is quasi co-located (e.g., Type D) with another beam, then the two beams may be pointing in similar directions.

As indicated above, FIG. 14 is provided as an example. Other examples may differ from what is described with regard to FIG. 14.

Figure 15:
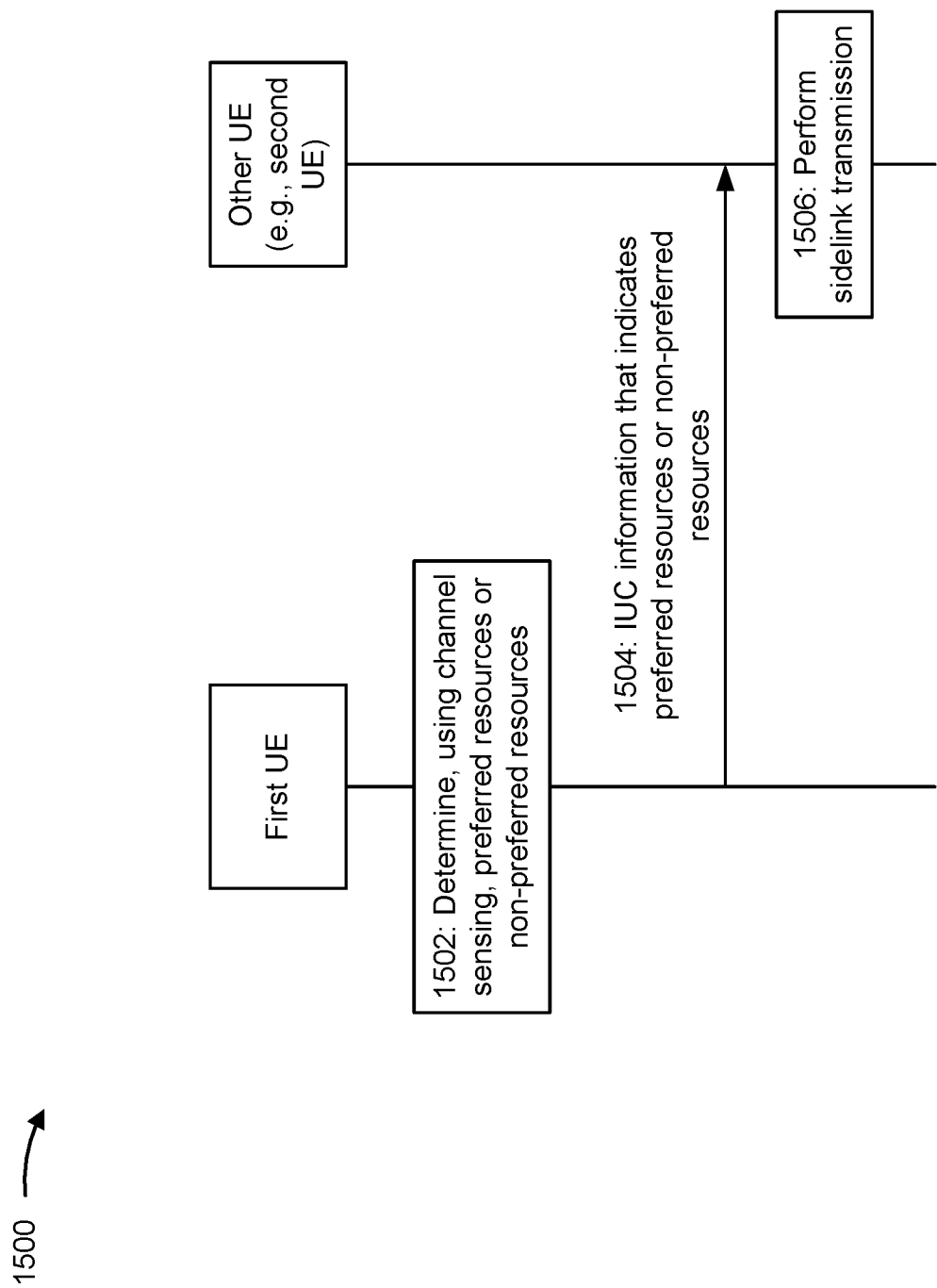

FIG. 15 is a diagram illustrating an example 1500 associated with transmitting IUC information based at least in part on beamforming, in accordance with the present disclosure. As shown in FIG. 15, communication may occur between a first UE (e.g., UE 120*a*) and a second UE (e.g., network node 110*e*). In some aspects, the first UE and the second UE may be included in a wireless network, such as wireless network 100.

As shown by reference number 1502, the first UE may determine, using an Rx beam of the first UE and based at least in part on a channel sensing, preferred resources or non-preferred resources of the first UE for a sidelink transmission by the second UE (e.g., any UE such as the second UE). The first UE may perform the channel sensing using the Rx beam of the first UE. The Rx beam of the first UE may be associated with a TCI state or a spatial relation.

As shown by reference number 1504, the first UE may transmit, using a Tx beam of the first UE that is associated or quasi co-located with the Rx beam of the first UE, IUC information. The first UE may transmit the IUC information based at least in part on a condition being satisfied at the first UE. The IUC information may be based at least in part on the channel sensing by the first UE using the Rx beam of the first UE. The IUC information may indicate the preferred resources or the non-preferred resources of the first UE for a sidelink transmission by the second UE. The Tx beam of the first UE may be associated with a TCI state or a spatial relation. The Tx beam of the first UE used to transmit the IUC information may be quasi co-located with the Rx beam of the first UE used to perform the channel sensing to determine the preferred resources or the non-preferred resources of the first UE. In some aspects, the IUC information may not be directed to any particular UE. The IUC information be received by the second UE via an Rx beam of the second UE. The Rx beam of the second UE may be associated with a TCI state or a spatial relation.

As shown by reference number 1506, the second UE may transmit, using a Tx beam of the second UE that is associated with the Rx beam of the second UE, the sidelink transmission based at least in part on the IUC information. The second UE may apply the preferred resources or the non-preferred resources of the first UE to the Tx beam of the second UE, where the Tx beam may be associated with the Rx beam of the second UE used to receive the IUC information. The second UE may transmit, using the Tx beam of the second UE, the sidelink transmission in resources selected based at least in part on the preferred resources or the non-preferred resources indicated in the IUC information. The Tx beam of the second UE may be associated with a TCI state or a spatial relation. The Rx beam of the second UE used to receive the IUC information may be quasi co-located with the Tx beam of the second UE to which the second UE may apply the IUC information, where the Tx beam of the second UE may be used to transmit the sidelink transmission.

In some aspects, the sidelink transmission may be based at least in part on the IUC information and a channel sensing by the second UE. The channel sensing by the second UE may be based at least in part on the Rx beam of the second UE that is quasi co-located with the Tx beam of the second UE used to transmit the sidelink transmission. The Rx beam of the second UE used to receive the IUC information may be quasi co-located with the Tx beam of the second UE used to transmit the sidelink transmission.

In some aspects, in an implicit approach, the first UE may use an Rx beam of the first UE to perform the channel sensing to determine the preferred or non-preferred resources for the second UE's sidelink transmission. The first UE may transmit the IUC information indicating the preferred or non-preferred resources using a Tx beam of the first UE. The first UE may transmit the IUC information and perform the channel sensing using corresponding beams (e.g., same beams). For example, the Tx beam of the first UE used to transmit the IUC information, which may be triggered by the condition, may be quasi co-located (e.g., Type D) with the Rx beam of the first UE used to determine the preferred or non-preferred resources. When the IUC information indicates the preferred resources, the first UE may operate in an Rx mode to receive, from the second UE, the sidelink transmission from the second UE. The first UE may receive the sidelink transmission from the second UE using the Rx beam of the first UE that is quasi co-located (e.g., Type D) with the Rx beam of the first UE used to determine the preferred resources for the second UE's sidelink transmission. The first UE may use the Rx beam of the first UE that is quasi co-located (e.g., Type D) with the Rx beam of the first UE used to determine the preferred resources to receive the sidelink transmission from the second UE in the preferred resources.

In some aspects, the Rx beam of the second UE used to receive the IUC information from the first UE may be quasi co-located (e.g., Type D) with the Tx beam of the second UE to which the second UE applies the IUC information. The second UE may transmit the sidelink transmission to the first UE in the first UE's preferred resources using the Tx beam of the second UE, where the Tx beam of the second UE may be quasi co-located (e.g., Type D) with the Rx beam of the second UE used to receive the first UE's IUC information. The second UE may not transmit in the first UE's non-preferred resources using any beam (e.g., the Tx beam of the second UE) that is quasi co-located (e.g., Type D) with the Rx beam of the second UE used to receive the first UE's IUC information.

In some aspects, when the second UE is using both the IUC information received from the first UE and its own channel sensing result, the second UE's channel sensing may be performed using an Rx beam (or TCI state or spatial relation) of the second UE that is quasi co-located with the Tx beam that the second UE will use to transmit the sidelink transmission. The Rx beam of the second UE used to receive the first UE's IUC information may be quasi co-located (e.g., Type D) with the Tx beam (or TCI state or spatial relation) of the second UE used to transmit the sidelink transmission.

As indicated above, FIG. 15 is provided as an example. Other examples may differ from what is described with regard to FIG. 15.

Figure 16:
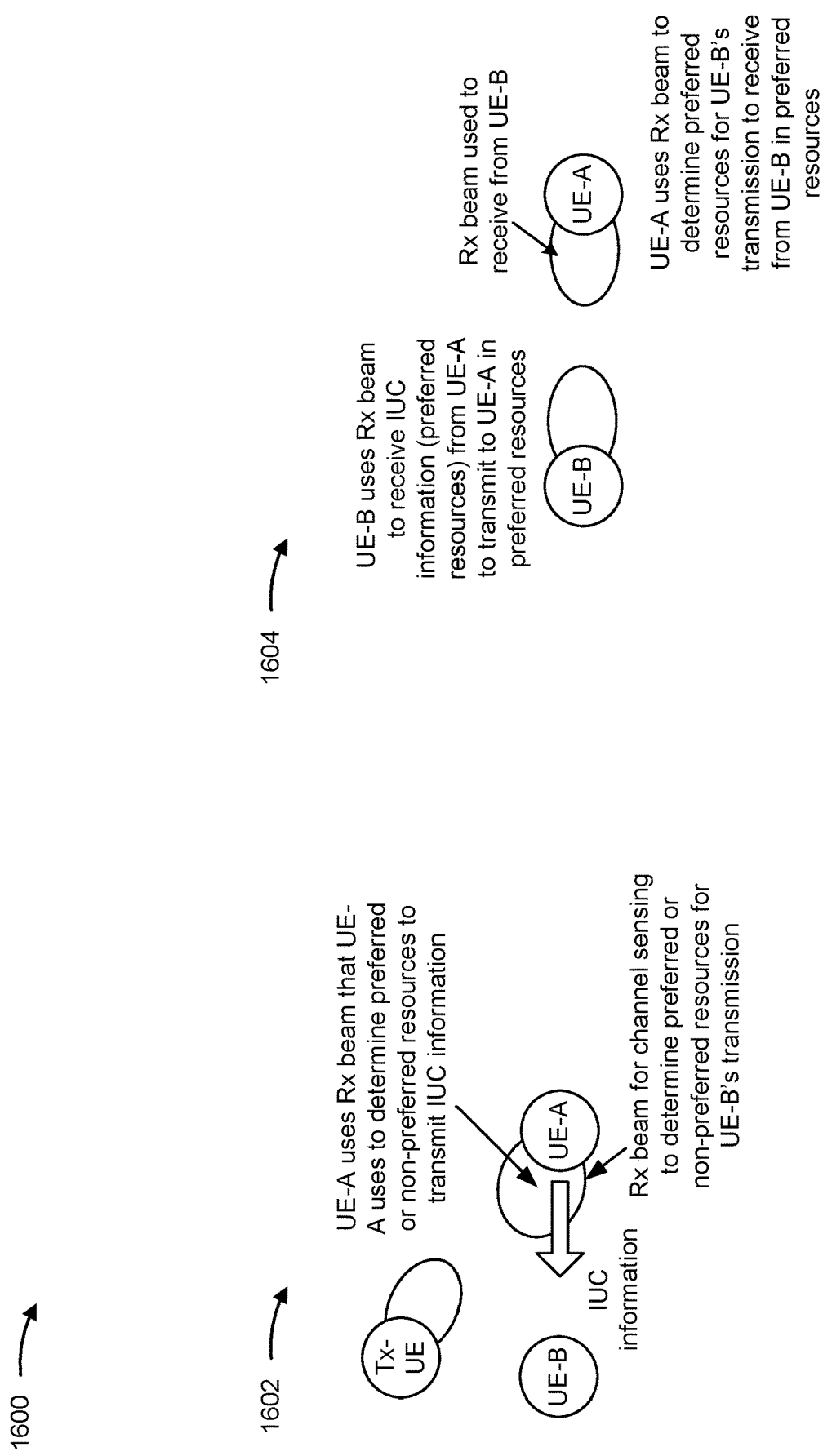

FIG. 16 is a diagram illustrating an example 1600 associated with transmitting IUC information based at least in part on beamforming, in accordance with the present disclosure.

As shown by reference number 1602, a first UE (e.g., UE-A) may be in communication with a second UE (e.g., UE-B) and a third UE (e.g., a Tx UE). The first UE may use an Rx beam of the first UE to perform a channel sensing to determine preferred or non-preferred resources for the second UE's transmission. The preferred or non-preferred resources may be from a perspective of the first UE. The first UE may use a Tx beam of the first UE, which corresponds to the Rx beam of the first UE used for determining the preferred or non-preferred resources, to transmit IUC information to the second UE. The IUC information may indicate the preferred or non-preferred resources for the second UE's sidelink transmission.

As shown by reference number 1604, the second UE may use an Rx beam of the second UE to receive the IUC information that indicates the preferred resources. The second UE may transmit, to the first UE and in the preferred resources, the sidelink transmission using a Tx beam of the second UE that is associated with the Rx beam of the second UE used to receive the IUC information. The first UE may use the Rx beam of the first UE used to determine the preferred resources for the second UE's sidelink transmission to receive the sidelink transmission from the first UE in the preferred resources.

As indicated above, FIG. 16 is provided as an example. Other examples may differ from what is described with regard to FIG. 16.

Figure 17:
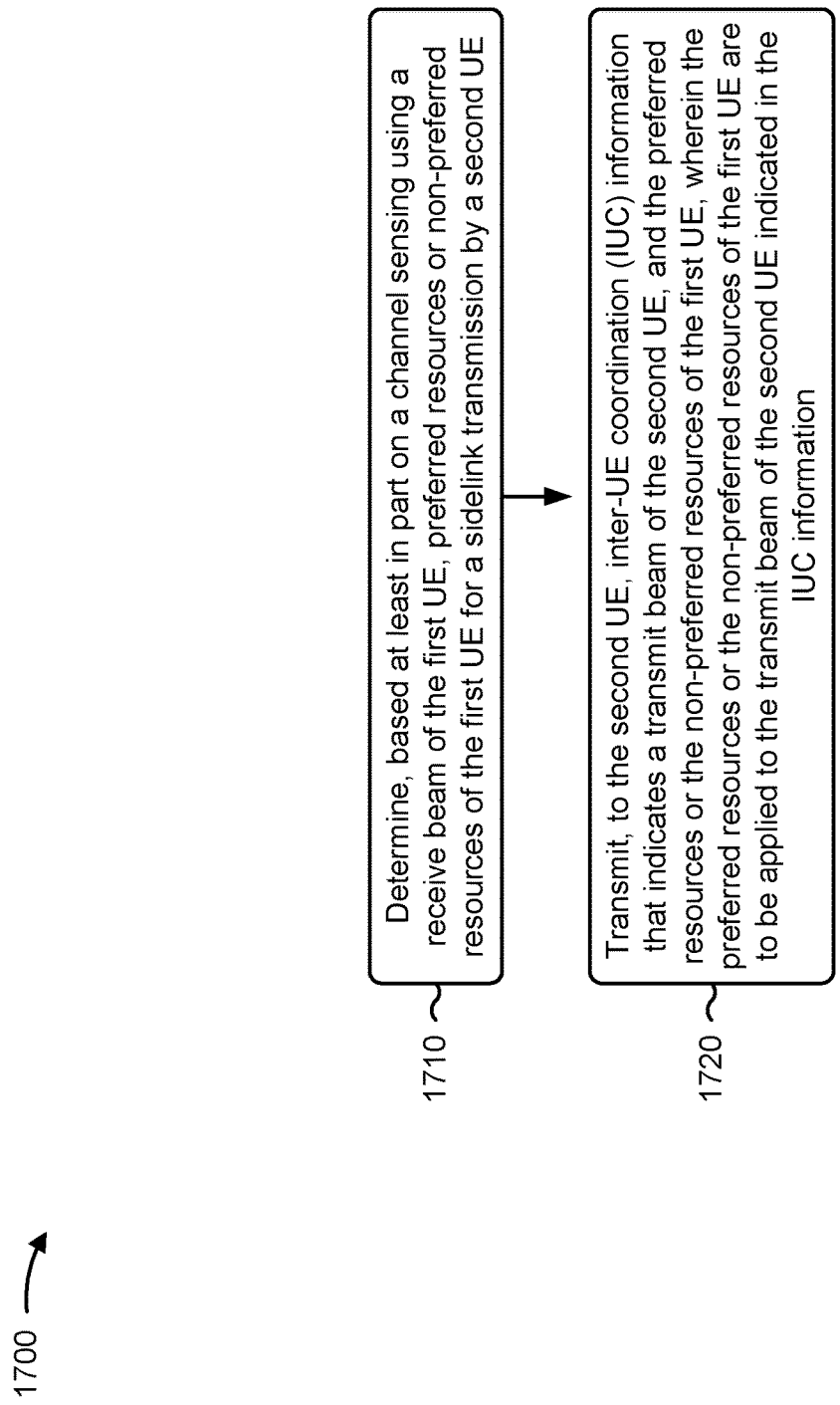
FIGS. 17-20 are diagrams illustrating example processes associated with transmitting IUC information based at least in part on beamforming, in accordance with the present disclosure.

FIG. 17 is a diagram illustrating an example process 1700 performed, for example, by a first UE, in accordance with the present disclosure. Example process 1700 is an example where the first UE (e.g., UE 120*a*) performs operations associated with transmitting IUC information based at least in part on beamforming.

As shown in FIG. 17, in some aspects, process 1700 may include determining, based at least in part on a channel sensing using an Rx beam of the first UE, preferred resources or non-preferred resources of the first UE for a sidelink transmission by a second UE (block 1710). For example, the first UE (e.g., using communication manager 140 and/or determination component 2108, depicted in FIG.

21) may determine, based at least in part on a channel sensing using an Rx beam of the first UE, preferred resources or non-preferred resources of the first UE for a sidelink transmission by a second UE, as described above.

As further shown in FIG. 17, in some aspects, process 1700 may include transmitting, to the second UE, IUC information that indicates: a Tx beam of the second UE, and the preferred resources or the non-preferred resources of the first UE, wherein the preferred resources or the non-preferred resources of the first UE are to be applied to the Tx beam of the second UE indicated in the IUC information (block 1720). For example, the first UE (e.g., using communication manager 140 and/or transmission component 2104, depicted in FIG. 21) may transmit, to the second UE, IUC information that indicates: a Tx beam of the second UE, and the preferred resources or the non-preferred resources of the first UE, wherein the preferred resources or the non-preferred resources of the first UE are to be applied to the Tx beam of the second UE indicated in the IUC information, as described above. In some aspects, the preferred resources or the non-preferred resources of the first UE are to be applied to the Tx beam of the second UE indicated in the IUC information.

Process 1700 may include additional aspects, such as any single aspect or any combination of aspects described below and/or in connection with one or more other processes described elsewhere herein.

In a first aspect, each of the Rx beam of the first UE and the Tx beam of the second UE is associated with a TCI state or a spatial relation.

In a second aspect, alone or in combination with the first aspect, the IUC information is transmitted via a MAC-CE that includes a field to indicate the Tx beam of the second UE for which the preferred resources or the non-preferred resources of the first UE are applicable.

In a third aspect, alone or in combination with one or more of the first and second aspects, the IUC information is transmitted via SCI that includes a field to indicate the Tx beam of the second UE for which the preferred resources or the non-preferred resources of the first UE are applicable.

In a fourth aspect, alone or in combination with one or more of the first through third aspects, the Rx beam of the first UE is quasi co-located with a second beam of the first UE that is associated with the Tx beam of the second UE indicated in the IUC information.

In a fifth aspect, alone or in combination with one or more of the first through fourth aspects, a beamformed link is established between the first UE and the second UE, wherein the second UE is configured to transmit or receive a reference signal and the first UE is configured to receive or transmit the reference signal, and the reference signal is associated with a TCI state or a spatial relation.

In a sixth aspect, alone or in combination with one or more of the first through fifth aspects, process 1700 includes transmitting the IUC information based at least in part on a condition being satisfied at the first UE.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
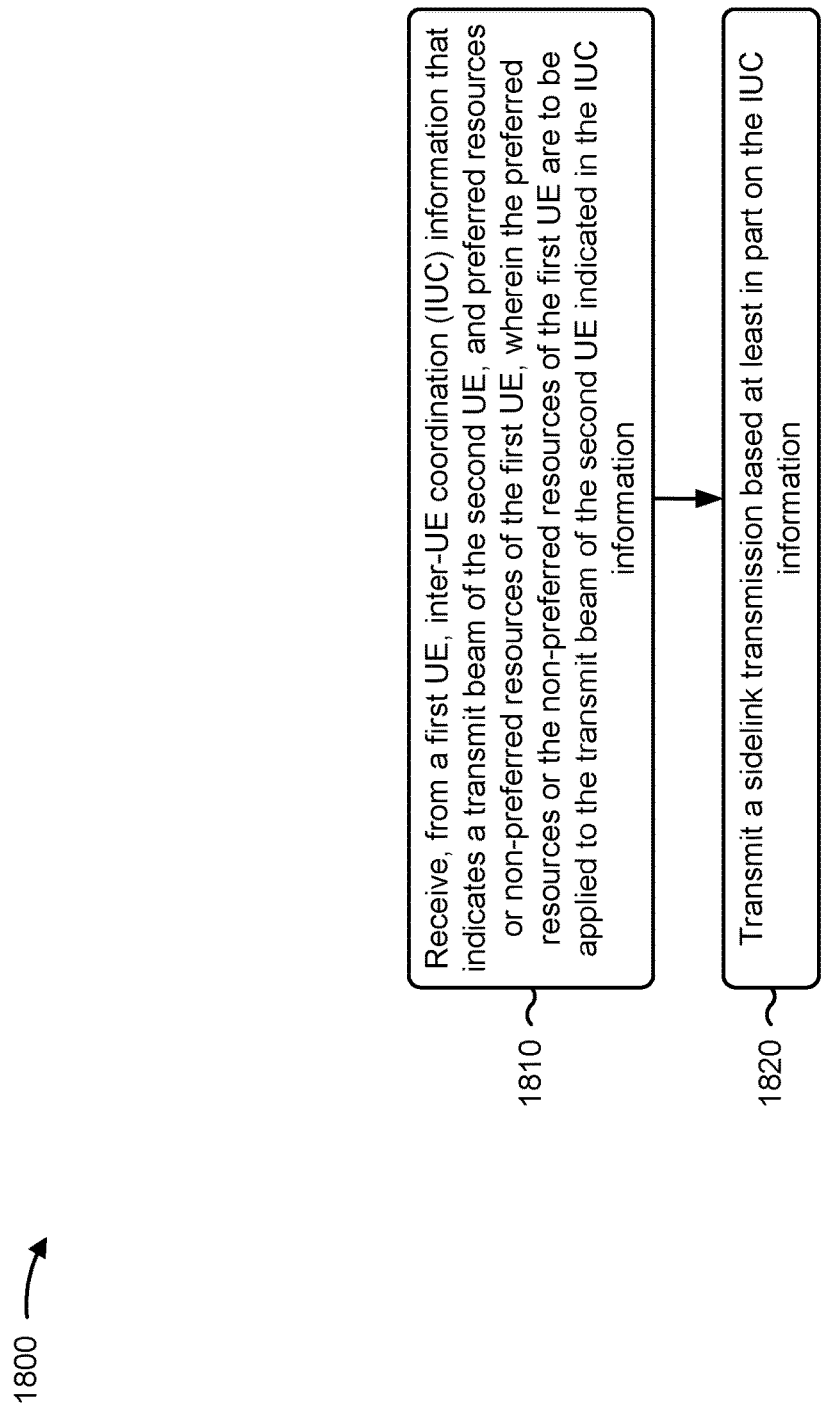

FIG. 18 is a diagram illustrating an example process 1800 performed, for example, by a second UE, in accordance with the present disclosure. Example process 1800 is an example where the second UE (e.g., UE 120e) performs operations associated with receiving IUC information based at least in part on beamforming.

As shown in FIG. 18, in some aspects, process 1800 may include receiving, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information (block 1810). For example, the second UE (e.g., using reception component 2202, depicted in FIG. 22) may receive, from a first UE, IUC information that indicates: a Tx beam of the second UE, and preferred resources or non-preferred resources of the first UE, wherein the preferred resources or the non-preferred resources of the first UE are to be applied to the Tx beam of the second UE indicated in the IUC information, as described above. In some aspects, the preferred resources or the non-preferred resources of the first UE are to be applied to the Tx beam of the second UE indicated in the IUC information.

As further shown in FIG. 18, in some aspects, process 1800 may include transmitting a sidelink transmission based at least in part on the IUC information (block 1820). For example, the second UE (e.g., using transmission component 2204, depicted in FIG. 22) may transmit a sidelink transmission based at least in part on the IUC information, as described above.

Process 1800 may include additional aspects, such as any single aspect or any combination of aspects described below and/or in connection with one or more other processes described elsewhere herein.

In a first aspect, an Rx beam of the first UE used for channel sensing is quasi co-located with a second beam of the first UE that is associated with the Tx beam of the second UE indicated in the IUC information.

In a second aspect, alone or in combination with the first aspect, the Tx beam of the second UE is associated with a TCI state or a spatial relation.

In a third aspect, alone or in combination with one or more of the first and second aspects, the IUC information is received via a MAC-CE that includes a field to indicate the Tx beam of the second UE for which the preferred resources or the non-preferred resources of the first UE are applicable.

In a fourth aspect, alone or in combination with one or more of the first through third aspects, the IUC information is received via SCI that includes a field to indicate the Tx beam of the second UE for which the preferred resources or the non-preferred resources of the first UE are applicable.

In a fifth aspect, alone or in combination with one or more of the first through fourth aspects, a beamformed link is established between the second UE and the first UE, wherein the second UE is configured to transmit or receive a reference signal and the first UE is configured to receive or transmit the reference signal, and the reference signal is associated with a TCI state or a spatial relation.

In a sixth aspect, alone or in combination with one or more of the first through fifth aspects, the IUC information is based at least in part on a condition being satisfied.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
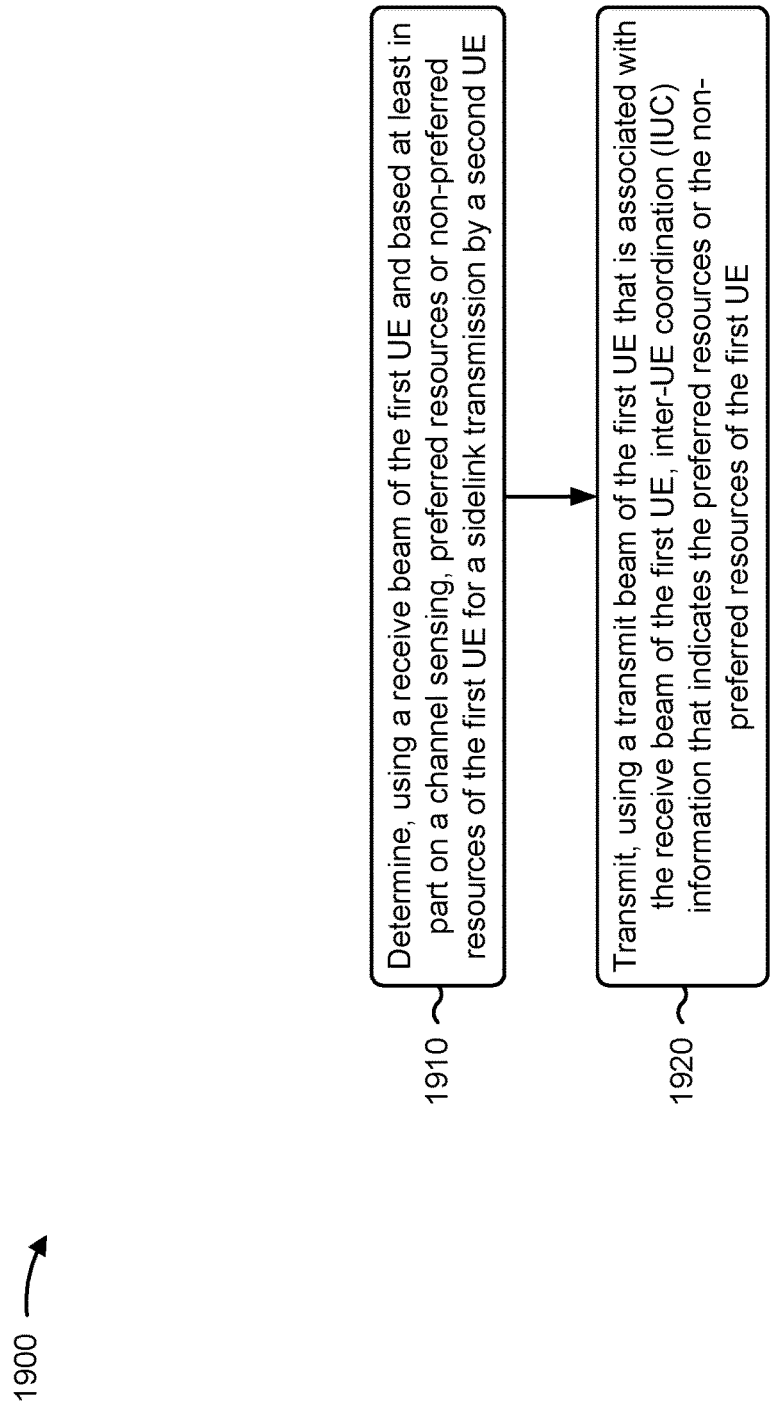

FIG. 19 is a diagram illustrating an example process 1900 performed, for example, by a first UE, in accordance with the present disclosure. Example process 1900 is an example where the first UE (e.g., UE 120*a*) performs operations associated with transmitting IUC information based at least in part on beamforming.

As shown in FIG. 19, in some aspects, process 1900 may include determining, using an Rx beam of the first UE and based at least in part on a channel sensing, preferred resources or non-preferred resources of the first UE for a sidelink transmission by a second UE (block 1910). For example, the first UE (e.g., using communication manager 140 and/or determination component 2108, depicted in FIG. 21) may determine, using an Rx beam of the first UE and based at least in part on a channel sensing, preferred resources or non-preferred resources of the first UE for a sidelink transmission by a second UE, as described above.

As further shown in FIG. 19, in some aspects, process 1900 may include transmitting, using a Tx beam of the first UE that is associated with the Rx beam of the first UE, IUC information that indicates the preferred resources or the non-preferred resources of the first UE (block 1920). For example, the first UE (e.g., using communication manager 140 and/or transmission component 2104, depicted in FIG. 21) may transmit, using a Tx beam of the first UE that is associated with the Rx beam of the first UE, IUC information that indicates the preferred resources or the non-preferred resources of the first UE, as described above.

Process 1900 may include additional aspects, such as any single aspect or any combination of aspects described below and/or in connection with one or more other processes described elsewhere herein.

In a first aspect, the Tx beam of the first UE used for transmitting the IUC information is quasi co-located with the Rx beam of the first UE used for performing the channel sensing to determine the preferred resources or the non-preferred resources of the first UE.

In a second aspect, alone or in combination with the first aspect, an Rx beam of the second UE used to receive the IUC information is quasi co-located with a Tx beam of the second UE to which the second UE applies the IUC information, and the Tx beam of the second UE is used to transmit the sidelink transmission.

In a third aspect, alone or in combination with one or more of the first and second aspects, the sidelink transmission is based at least in part on the IUC information and a channel sensing by the second UE.

In a fourth aspect, alone or in combination with one or more of the first through third aspects, the channel sensing by the second UE is based at least in part on the Rx beam of the second UE that is quasi co-located with a Tx beam of the second UE used for transmitting the sidelink transmission, and the Rx beam of the second UE used for receiving the IUC information is quasi co-located with the Tx beam of the second UE used for transmitting the sidelink transmission.

In a fifth aspect, alone or in combination with one or more of the first through fourth aspects, the sidelink transmission is associated with resources selected based at least in part on the non-preferred resources or the non-preferred resources indicated in the IUC information.

In a sixth aspect, alone or in combination with one or more of the first through fifth aspects, each of the Rx beam of the first UE and the Tx beam of the first UE is associated with a TCI state or a spatial relation.

In a seventh aspect, alone or in combination with one or more of the first through sixth aspects, process 1900 includes transmitting the IUC information is based at least in part on a condition being satisfied at the first UE.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
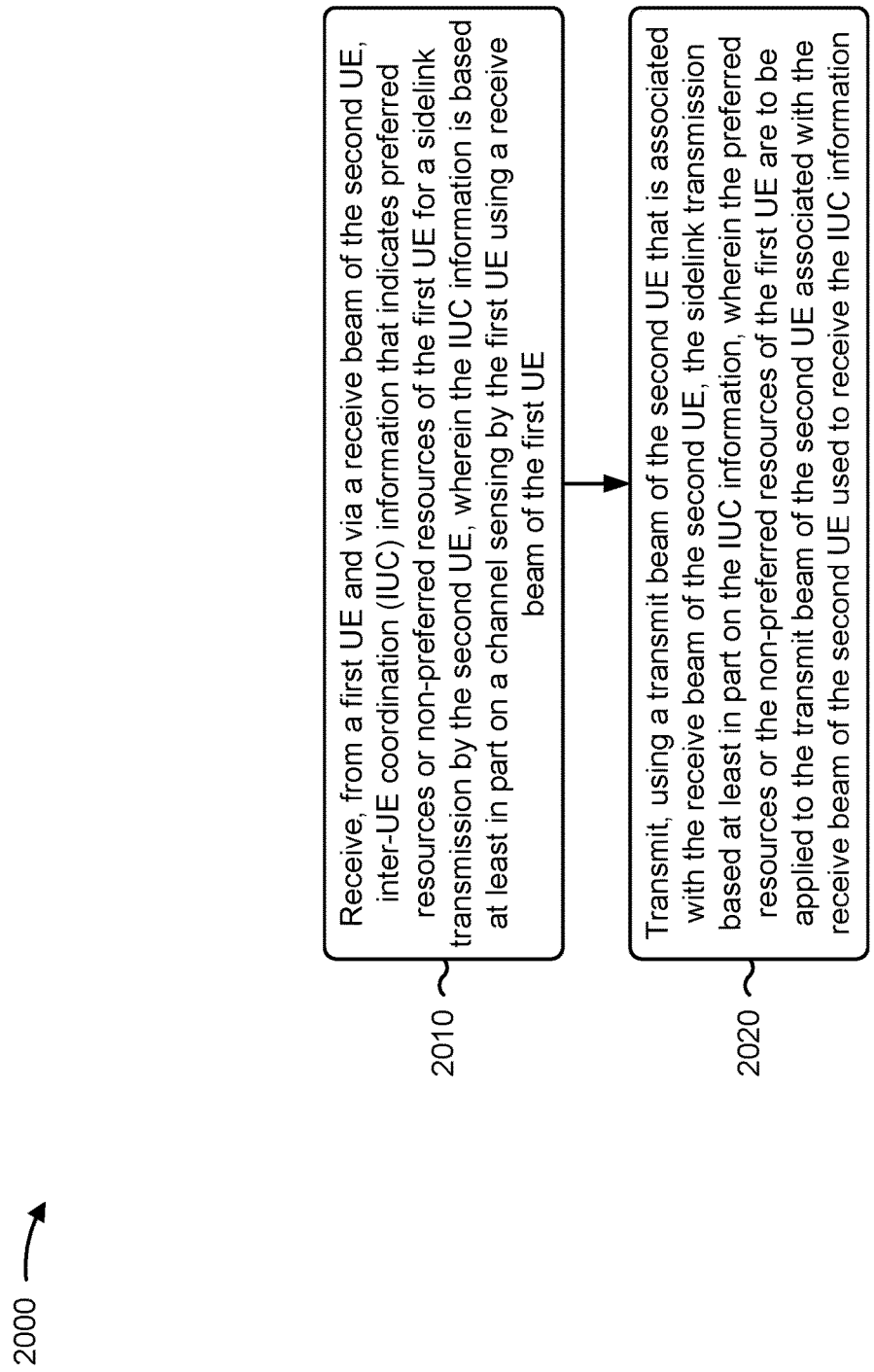

FIG. 20 is a diagram illustrating an example process 2000 performed, for example, by a second UE, in accordance with the present disclosure. Example process 2000 is an example where the second UE (e.g., UE 120*e*) performs operations associated with transmitting IUC information based at least in part on beamforming.

As shown in FIG. 20, in some aspects, process 2000 may include receiving, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE (block 2010). For example, the second UE (e.g., using reception component 2202, depicted in FIG. 22) may receive, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE, as described above.

As further shown in FIG. 20, in some aspects, process 2000 may include transmitting, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information (block 2020). For example, the second UE (e.g., using transmission component 2204, depicted in FIG. 22) may transmit, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information, as described above.

Process 2000 may include additional aspects, such as any single aspect or any combination of aspects described below and/or in connection with one or more other processes described elsewhere herein.

In a first aspect, a Tx beam of the first UE used for transmitting the IUC information is quasi co-located with the Rx beam of the first UE used for performing the channel sensing to determine the preferred resources or the non-preferred resources of the first UE.

In a second aspect, alone or in combination with the first aspect, process 2000 includes transmitting, via the Tx beam of the second UE, the sidelink transmission in resources selected based on the preferred resources or the non-preferred resources indicated in the IUC information.

In a third aspect, alone or in combination with one or more of the first and second aspects, the Rx beam of the second UE used for receiving the IUC information is quasi co-located with the Tx beam of the second UE to which the second UE applies the IUC information, and the Tx beam of the second UE is used for transmitting the sidelink transmission.

In a fourth aspect, alone or in combination with one or more of the first through third aspects, the sidelink transmission is based at least in part on the IUC information and a channel sensing by the second UE, wherein the channel sensing by the second UE is based at least in part on the Rx beam of the second UE that is quasi co-located with the Tx beam of the second UE used to transmit the sidelink transmission, and the Rx beam of the second UE used to receive the IUC information is quasi co-located with the Tx beam of the second UE used to transmit the sidelink transmission.

In a fifth aspect, alone or in combination with one or more of the first through fourth aspects, the second UE transmits the sidelink transmission in resources selected based at least in part on the preferred resources or the non-preferred resources indicated in the IUC information.

In a sixth aspect, alone or in combination with one or more of the first through fifth aspects, each of the Rx beam of the second UE and the Tx beam of the second UE is associated with a TCI state or a spatial relation.

In a seventh aspect, alone or in combination with one or more of the first through sixth aspects, the IUC information is transmitted by the first UE based at least in part on a condition being satisfied at the first UE.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
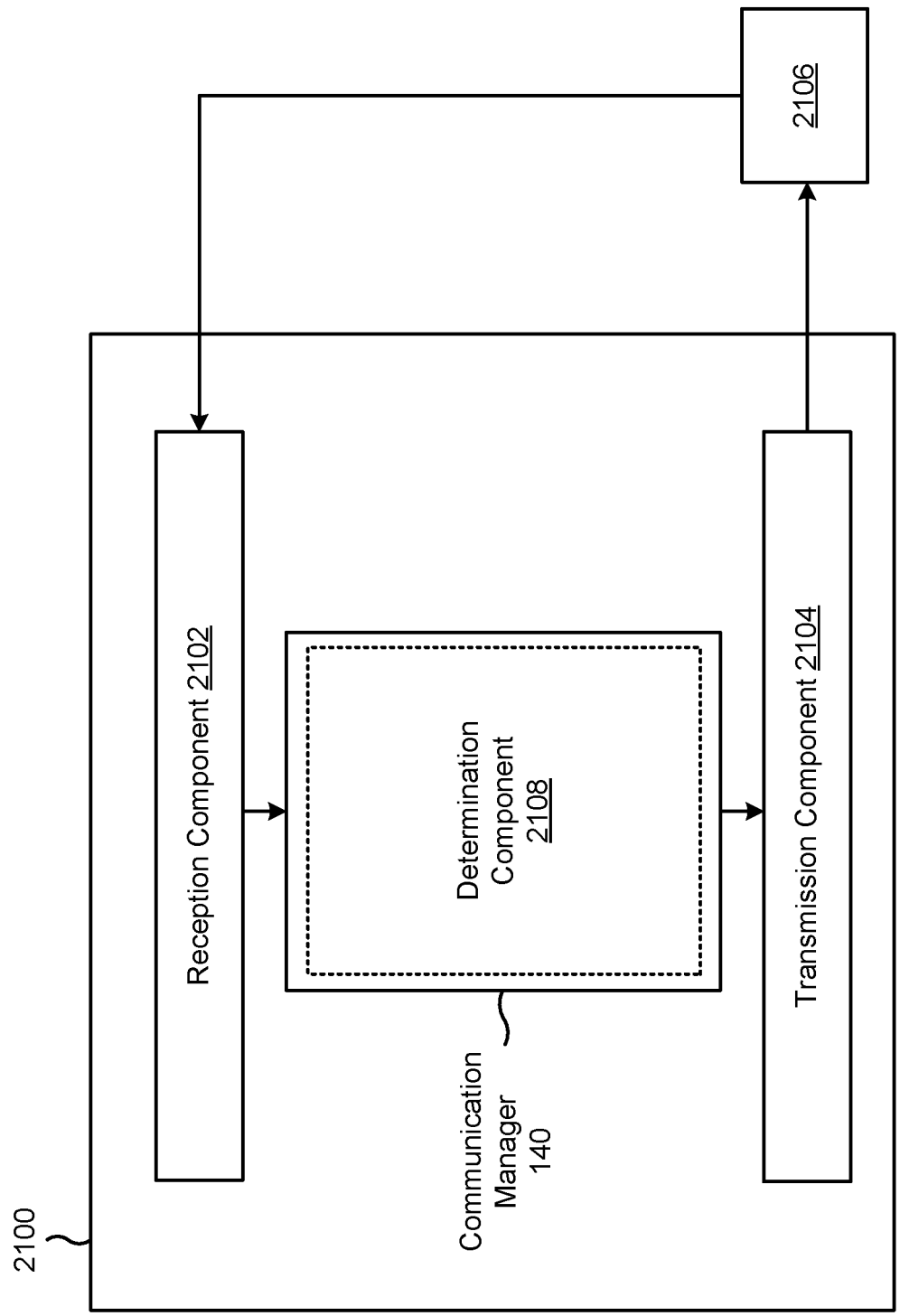
FIGS. 21-22 are diagrams of example apparatuses for wireless communication, in accordance with the present disclosure.

FIG. 21 is a diagram of an example apparatus 2100 for wireless communication, in accordance with the present disclosure. The apparatus 2100 may be a first UE, or a first UE may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 140. The communication manager 140 may include one or more of a determination component 2108, among other examples.

In some aspects, the apparatus 2100 may be configured to perform one or more operations described herein in connection with FIGS. 13-16. Additionally, or alternatively, the apparatus 2100 may be configured to perform one or more processes described herein, such as process 1700 of FIG. 17, process 1900 of FIG. 19, or a combination thereof. In some aspects, the apparatus 2100 and/or one or more components shown in FIG. 21 may include one or more components of the first UE described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the first UE described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of the first UE described in connection with FIG. 2. In some aspects, the transmission component 2104 may be co-located with the reception component 2102 in a transceiver.

The determination component 2108 may determine, based at least in part on a channel sensing using an Rx beam of the first UE, preferred resources or non-preferred resources of the first UE for a sidelink transmission by a second UE. The transmission component 2104 may transmit, to the second UE, IUC information that indicates a Tx beam of the second UE, and the preferred resources or the non-preferred resources of the first UE, wherein the preferred resources or the non-preferred resources of the first UE are to be applied to the Tx beam of the second UE indicated in the IUC information.

The determination component 2108 may determine, using an Rx beam of the first UE and based at least in part on a channel sensing, preferred resources or non-preferred resources of the first UE for a sidelink transmission by a second UE. The transmission component 2104 may transmit, using a Tx beam of the first UE that is associated with the Rx beam of the first UE, IUC information that indicates the preferred resources or the non-preferred resources of the first UE.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
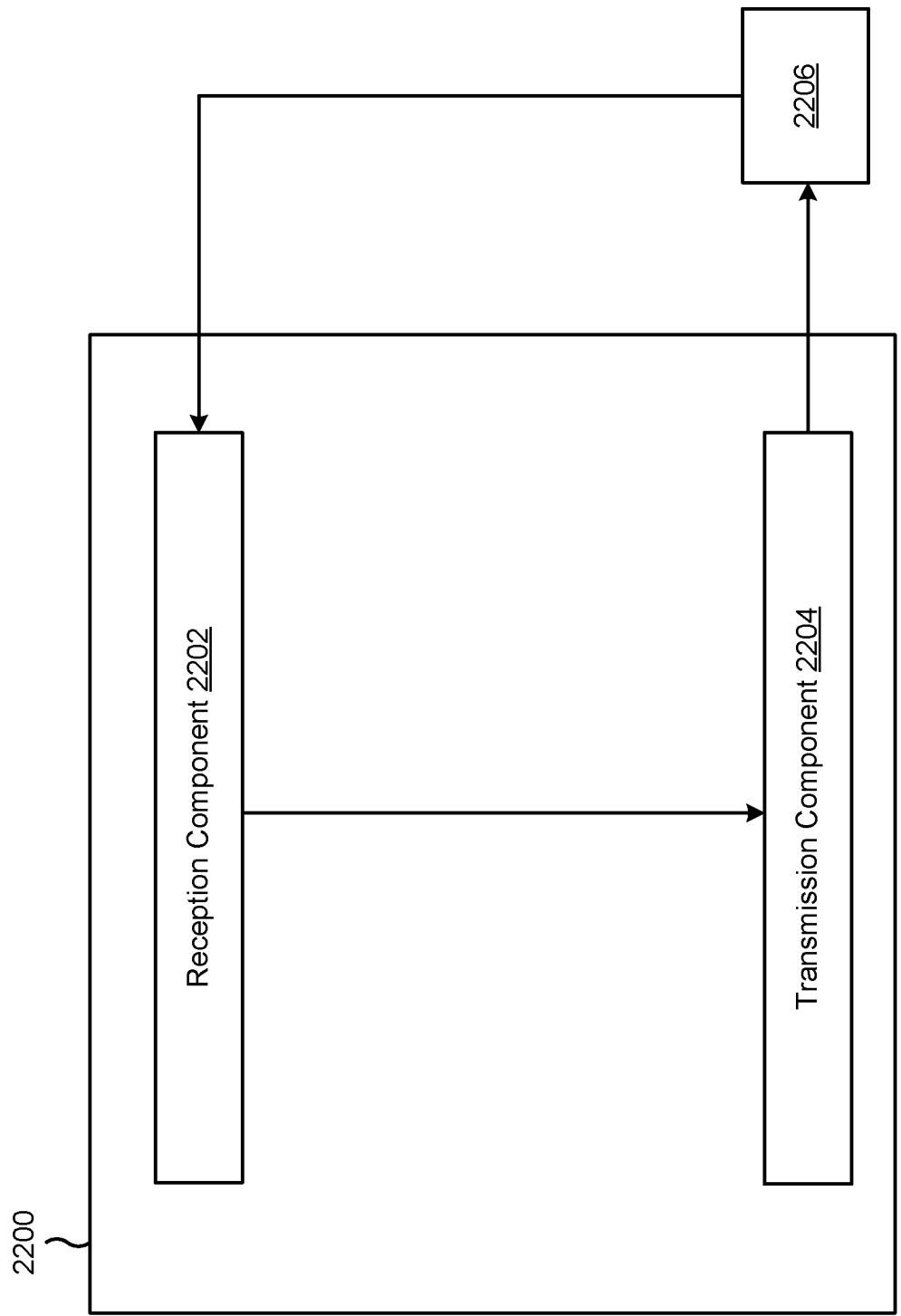

FIG. 22 is a diagram of an example apparatus 2200 for wireless communication, in accordance with the present disclosure. The apparatus 2200 may be a second UE, or a second UE may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204.

In some aspects, the apparatus 2200 may be configured to perform one or more operations described herein in connection with FIGS. 13-16. Additionally, or alternatively, the apparatus 2200 may be configured to perform one or more processes described herein, such as process 1800 of FIG. 18, process 2000 of FIG. 20, or a combination thereof. In some aspects, the apparatus 2200 and/or one or more components shown in FIG. 22 may include one or more components of the second UE described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a modem, a demodulator, a MIMO detector, a receive processor, a controller/processor, a memory, or a combination thereof, of the second UE described in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modem, a modulator, a transmit MIMO processor, a transmit processor, a controller/processor, a memory, or a combination thereof, of the second UE described in connection with FIG. 2. In some aspects, the transmission component 2204 may be co-located with the reception component 2202 in a transceiver.

The reception component 2202 may receive, from a first UE, IUC information that indicates a Tx beam of the second UE, and preferred resources or non-preferred resources of the first UE, wherein the preferred resources or the non-preferred resources of the first UE are to be applied to the Tx beam of the second UE indicated in the IUC information. The transmission component 2204 may transmit a sidelink transmission based at least in part on the IUC information.

The reception component 2202 may receive, from a first UE and via an Rx beam of the second UE, IUC information that indicates preferred resources or non-preferred resources of the first UE for a sidelink transmission by the second UE, wherein the IUC information is based at least in part on a channel sensing by the first UE using an Rx beam of the first UE. The transmission component 2204 may transmit, using a Tx beam of the second UE that is associated with the Rx beam of the second UE, the sidelink transmission based at least in part on the IUC information, wherein the preferred resources or the non-preferred resources of the first UE are to be applied to the Tx beam of the second UE associated with the Rx beam of the second UE used to receive the IUC information.

The transmission component 2204 may transmit, via the Tx beam of the second UE, the sidelink transmission in resources selected based on the preferred resources or the non-preferred resources indicated in the IUC information.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

The following provides an overview of some Aspects of the present disclosure:

Aspect 1: A method of wireless communication performed by a first user equipment (UE), comprising: determining, based at least in part on a channel sensing using a receive beam of the first UE, preferred resources or non-preferred resources of the first UE for a sidelink transmission by a second UE; and transmitting, to the second UE, inter-UE coordination (IUC) information that indicates: a transmit beam of the second UE, and the preferred resources or the non-preferred resources of the first UE, wherein the preferred resources or the non-preferred resources of the first UE are to be applied to the transmit beam of the second UE indicated in the IUC information.

Aspect 2: The method of Aspect 1, wherein each of the receive beam of the first UE and the transmit beam of the second UE is associated with a transmission configuration indicator state or a spatial relation.

Aspect 3: The method of any of Aspects 1 through 2, wherein the IUC information is transmitted via a medium access control control element that includes a field to indicate the transmit beam of the second UE for which the preferred resources or the non-preferred resources of the first UE are applicable.

Aspect 4: The method of any of Aspects 1 through 3, wherein the IUC information is transmitted via sidelink control information that includes a field to indicate the transmit beam of the second UE for which the preferred resources or the non-preferred resources of the first UE are applicable.

Aspect 5: The method of any of Aspects 1 through 4, wherein the receive beam of the first UE is quasi co-located with a second beam of the first UE that is associated with the transmit beam of the second UE indicated in the IUC information.

Aspect 6: The method of any of Aspects 1 through 5, wherein a beamformed link is established between the first UE and the second UE, wherein the second UE is configured to transmit or receive a reference signal and the first UE is configured to receive or transmit the reference signal, and wherein the reference signal is associated with a transmission configuration indicator state or a spatial relation.

Aspect 7: The method of any of Aspects 1 through 6, wherein transmitting the IUC information is based at least in part on a condition being satisfied at the first UE.

Aspect 8: A method of wireless communication performed by a second user equipment (UE), comprising: receiving, from a first UE, inter-UE coordination (IUC) information that indicates: a transmit beam of the second UE, and preferred resources or non-preferred resources of the first UE, wherein the preferred resources or the non-preferred resources of the first UE are to be applied to the transmit beam of the second UE indicated in the IUC information; and transmitting a sidelink transmission based at least in part on the IUC information.

Aspect 9: The method of Aspect 8, wherein a receive beam of the first UE used for channel sensing is quasi co-located with a second beam of the first UE that is associated with the transmit beam of the second UE indicated in the IUC information.

Aspect 10: The method of any of Aspects 8 through 9, wherein the transmit beam of the second UE is associated with a transmission configuration indicator state or a spatial relation.

Aspect 11: The method of any of Aspects 8 through 10, wherein the IUC information is received via a medium access control control element that includes a field to indicate the transmit beam of the second UE for which the preferred resources or the non-preferred resources of the first UE are applicable.

Aspect 12: The method of any of Aspects 8 through 11, wherein the IUC information is received via sidelink control information that includes a field to indicate the transmit beam of the second UE for which the preferred resources or the non-preferred resources of the first UE are applicable.

Aspect 13: The method of any of Aspects 8 through 12, wherein a beamformed link is established between the second UE and the first UE, wherein the second UE is configured to transmit or receive a reference signal and the first UE is configured to receive or transmit the reference signal, and wherein the reference signal is associated with a transmission configuration indicator state or a spatial relation.

Aspect 14: The method of any of Aspects 8 through 13, wherein the IUC information is transmitted based at least in part on a condition being satisfied at the first UE.

Aspect 15: A method of wireless communication performed by a first user equipment (UE), comprising: determining, using a receive beam of the first UE and based at least in part on a channel sensing, preferred resources or non-preferred resources of the first UE for a sidelink transmission by a second UE; and transmitting, using a transmit beam of the first UE that is associated with the receive beam of the first UE, inter-UE coordination (IUC) information that indicates the preferred resources or the non-preferred resources of the first UE.

Aspect 16: The method of Aspect 15, wherein the transmit beam of the first UE used for transmitting the IUC information is quasi co-located with the receive beam of the first UE used for performing the channel sensing to determine the preferred resources or the non-preferred resources of the first UE.

Aspect 17: The method of any of Aspects 15 through 16, wherein a receive beam of the second UE used to receive the IUC information is quasi co-located with a transmit beam of the second UE to which the second UE applies the IUC information, and wherein the transmit beam of the second UE is used to transmit the sidelink transmission.

Aspect 18: The method of any of Aspects 15 through 17, wherein the sidelink transmission is based at least in part on the IUC information and a channel sensing by the second UE.

Aspect 19: The method of Aspect 18, wherein the channel sensing by the second UE is based at least in part on the receive beam of the second UE that is quasi co-located with a transmit beam of the second UE used for transmitting the sidelink transmission, and wherein the receive beam of the second UE used for receiving the IUC information is quasi co-located with the transmit beam of the second UE used for transmitting the sidelink transmission.

Aspect 20: The method of any of Aspects 15 through 19, wherein the sidelink transmission is associated with resources selected based at least in part on the non-preferred resources or the non-preferred resources indicated in the IUC information.

Aspect 21: The method of any of Aspects 15 through 20, wherein each of the receive beam of the first UE and the transmit beam of the first UE is associated with a transmission configuration indicator state or a spatial relation.

Aspect 22: The method of any of Aspects 15 through 21, wherein transmitting the IUC information is based at least in part on a condition being satisfied at the first UE.

Aspect 23: A method of wireless communication performed by a second user equipment (UE), comprising: receiving, from a first UE and via a receive beam of the second UE, inter-UE coordination (IUC) information that indicates preferred resources or non-preferred resources of the first UE for a sidelink transmission by the second UE, wherein the IUC information is based at least in part on a channel sensing by the first UE using a receive beam of the first UE; and transmitting, using a transmit beam of the second UE that is associated with the receive beam of the second UE, the sidelink transmission based at least in part on the IUC information, wherein the preferred resources or the non-preferred resources of the first UE are to be applied to the transmit beam of the second UE associated with the receive beam of the second UE used to receive the IUC information.

Aspect 24: The method of Aspect 23, wherein a transmit beam of the first UE used for transmitting the IUC information is quasi co-located with the receive beam of the first UE used for performing the channel sensing to determine the preferred resources or the non-preferred resources of the first UE.

Aspect 25: The method of any of Aspects 23 through 24, further comprising: transmitting, via the transmit beam of the second UE, the sidelink transmission in resources selected based on the preferred resources or the non-preferred resources indicated in the IUC information.

Aspect 26: The method of any of Aspects 23 through 25, wherein the receive beam of the second UE used for receiving the IUC information is quasi co-located with the transmit beam of the second UE to which the second UE applies the IUC information, and wherein the transmit beam of the second UE is used for transmitting the sidelink transmission.

Aspect 27: The method of any of Aspects 23 through 26, wherein the sidelink transmission is based at least in part on the IUC information and a channel sensing by the second UE, wherein the channel sensing by the second UE is based at least in part on the receive beam of the second UE that is quasi co-located with the transmit beam of the second UE used to transmit the sidelink transmission, and wherein the receive beam of the second UE used to receive the IUC information is quasi co-located with the transmit beam of the second UE used to transmit the sidelink transmission.

Aspect 28: The method of any of Aspects 23 through 27, wherein the second UE transmits the sidelink transmission in resources selected based at least in part on the preferred resources or the non-preferred resources indicated in the IUC information.

Aspect 29: The method of any of Aspects 23 through 28, wherein each of the receive beam of the second UE and the transmit beam of the second UE is associated with a transmission configuration indicator state or a spatial relation.

Aspect 30: The method of any of Aspects 23 through 29, wherein the IUC information is transmitted based at least in part on a condition being satisfied at the first UE.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
 a memory; and
 one or more processors, coupled to the memory, configured to:
  determine, based at least in part on a channel sensing using a receive beam of the first UE, preferred resources or non-preferred resources of the first UE for a sidelink transmission by a second UE; and
  transmit, to the second UE, inter-UE coordination (IUC) information that indicates:
   a transmit beam of the second UE, and the preferred resources or the non-preferred resources of the first UE,
wherein the preferred resources or the non-preferred resources of the first UE are to be applied to the transmit beam of the second UE, and
wherein the receive beam of the first UE is quasi co-located with a second beam of the first UE that is associated with the transmit beam of the second UE.

2. The apparatus of claim 1, wherein each of the receive beam of the first UE and the transmit beam of the second UE is associated with a transmission configuration indicator state or a spatial relation.

3. The apparatus of claim 1, wherein the IUC information is transmitted via a medium access control control element that includes a field to indicate the transmit beam of the second UE for which the preferred resources or the non-preferred resources of the first UE are applicable.

4. The apparatus of claim 1, wherein the IUC information is transmitted via sidelink control information that includes a field to indicate the transmit beam of the second UE for which the preferred resources or the non-preferred resources of the first UE are applicable.

5. The apparatus of claim 1, wherein a beamformed link is established between the first UE and the second UE, wherein the second UE is configured to transmit or receive a reference signal and the first UE is configured to receive or transmit the reference signal, and wherein the reference signal is associated with a transmission configuration indicator state or a spatial relation.

6. The apparatus of claim 1, wherein the one or more processors are configured to transmit the IUC information based at least in part on a condition being satisfied at the first UE.

7. An apparatus for wireless communication at a second user equipment (UE), comprising:
a memory; and
one or more processors, coupled to the memory, configured to:
receive, from a first UE, inter-UE coordination (IUC) information that indicates:
a transmit beam of the second UE, and
preferred resources or non-preferred resources of the first UE,
wherein the preferred resources or the non-preferred resources of the first UE are to be applied to the transmit beam of the second UE, and
wherein a receive beam of the first UE used for channel sensing is quasi co-located with a second beam of the first UE that is associated with the transmit beam of the second UE; and
transmit a sidelink transmission based at least in part on the IUC information.

8. The apparatus of claim 7, wherein the transmit beam of the second UE is associated with a transmission configuration indicator state or a spatial relation.

9. The apparatus of claim 7, wherein the IUC information is received via a medium access control control element that includes a field to indicate the transmit beam of the second UE for which the preferred resources or the non-preferred resources of the first UE are applicable.

10. The apparatus of claim 7, wherein the IUC information is received via sidelink control information that includes a field to indicate the transmit beam of the second UE for which the preferred resources or the non-preferred resources of the first UE are applicable.

11. The apparatus of claim 7, wherein a beamformed link is established between the second UE and the first UE, wherein the second UE is configured to transmit or receive a reference signal and the first UE is configured to receive or transmit the reference signal, and wherein the reference signal is associated with a transmission configuration indicator state or a spatial relation.

12. The apparatus of claim 7, wherein the IUC information is transmitted based at least in part on a condition being satisfied at the first UE.

13. An apparatus for wireless communication at a first user equipment (UE), comprising:
a memory; and
one or more processors, coupled to the memory, configured to:
determine, using a receive beam of the first UE and based at least in part on a channel sensing, preferred resources or non-preferred resources of the first UE for a sidelink transmission by a second UE; and
transmit, using a transmit beam of the first UE that is associated with the receive beam of the first UE, inter-UE coordination (IUC) information that indicates the preferred resources or the non-preferred resources of the first UE, wherein the transmit beam of the first UE is quasi co-located with the receive beam of the first UE.

14. The apparatus of claim 13, wherein a receive beam of the second UE used to receive the IUC information is quasi co-located with a transmit beam of the second UE to which the second UE applies the IUC information, and wherein the transmit beam of the second UE is used to transmit the sidelink transmission.

15. The apparatus of claim 13, wherein the sidelink transmission is based at least in part on the IUC information and a channel sensing by the second UE.

16. The apparatus of claim 15, wherein the channel sensing by the second UE is based at least in part on a receive beam of the second UE that is quasi co-located with a transmit beam of the second UE used to transmit the sidelink transmission, and wherein the receive beam of the second UE used to receive the IUC information is quasi co-located with the transmit beam of the second UE used to transmit the sidelink transmission.

17. The apparatus of claim 13, wherein the sidelink transmission is associated with resources selected based at least in part on the preferred resources or the non-preferred resources indicated in the IUC information.

18. The apparatus of claim 13, wherein each of the receive beam of the first UE and the transmit beam of the first UE is associated with a transmission configuration indicator state or a spatial relation.

19. The apparatus of claim 13, wherein the one or more processors are configured to transmit the IUC information based at least in part on a condition being satisfied at the first UE.

20. An apparatus for wireless communication at a second user equipment (UE), comprising:
a memory; and
one or more processors, coupled to the memory, configured to:
receive, from a first UE and via a receive beam of the second UE, inter-UE coordination (IUC) information that indicates preferred resources or non-preferred resources of the first UE for a sidelink transmission by the second UE, wherein the IUC information is based at least in part on a channel sensing by the first UE using a receive beam of the first UE; and transmit, using a transmit beam of the second UE that is associated with the receive beam of the second UE, the sidelink transmission based at least in part on the IUC information, wherein the preferred resources or the non-preferred resources of the first UE are to be applied to the transmit beam of the second UE associated with the receive beam of the second UE used to receive the IUC information, and wherein the receive beam of the second UE is quasi co-located with the transmit beam of the second UE to which the second UE applies the IUC information.

21. The apparatus of claim 20, wherein a transmit beam of the first UE used to transmit the IUC information is quasi co-located with the receive beam of the first UE used to perform the channel sensing to determine the preferred resources or the non-preferred resources of the first UE.

22. The apparatus of claim 20, wherein the one or more processors are further configured to:
transmit, via the transmit beam of the second UE, the sidelink transmission in resources selected based on the preferred resources or the non-preferred resources indicated in the IUC information.

23. The apparatus of claim 20, wherein the transmit beam of the second UE is used to transmit the sidelink transmission.

24. The apparatus of claim 20, wherein the sidelink transmission is based at least in part on the IUC information and a channel sensing by the second UE, wherein the channel sensing by the second UE is based at least in part on the receive beam of the second UE that is quasi co-located with the transmit beam of the second UE used to transmit the sidelink transmission.

25. The apparatus of claim 20, wherein the second UE transmits the sidelink transmission in resources selected based at least in part on the preferred resources or the non-preferred resources indicated in the IUC information.

26. The apparatus of claim 20, wherein each of the receive beam of the second UE and the transmit beam of the second UE is associated with a transmission configuration indicator state or a spatial relation.

27. The apparatus of claim 20, wherein the IUC information is transmitted based at least in part on a condition being satisfied at the first UE.

28. The apparatus of claim 1, wherein the IUC information indicates the transmit beam of the second UE via a transmission configuration indicator state, a spatial relation, or a spatial filter, to enable the second UE to determine the transmit beam.

29. The apparatus of claim 7, wherein the IUC information indicates the transmit beam of the second UE via a transmission configuration indicator state, a spatial relation, or a spatial filter, to enable the second UE to determine the transmit beam.

30. The apparatus of claim 13, wherein the IUC information is transmitted via a medium access control control element or sidelink control information.

31. The apparatus of claim 13, wherein a beamformed link is established between the first UE and the second UE.

32. The apparatus of claim 20, wherein a beamformed link is established between the first UE and the second UE.

\* \* \* \* \*